US009467036B2

(12) United States Patent
Bootsma, Jr.

(10) Patent No.: US 9,467,036 B2
(45) Date of Patent: Oct. 11, 2016

(54) DEVICES AND METHODS FOR MECHANICALLY COUPLING MAGNETIC FIELD INDUCED MOTION

(71) Applicant: NEODYMIUM ENERGY LLc, Melville, NY (US)

(72) Inventor: Pieter Bootsma, Jr., Oakland Gardens, NY (US)

(*) Notice: Subject to any disclaimer, the term of this patent is extended or adjusted under 35 U.S.C. 154(b) by 337 days.

(21) Appl. No.: 14/051,642

(22) Filed: Oct. 11, 2013

(65) Prior Publication Data
US 2014/0111049 A1  Apr. 24, 2014

Related U.S. Application Data

(60) Provisional application No. 61/713,129, filed on Oct. 12, 2012.

(51) Int. Cl.
*H02K 21/00* (2006.01)
*H02K 53/00* (2006.01)
*H02K 49/10* (2006.01)
*H02K 16/00* (2006.01)

(52) U.S. Cl.
CPC .............. *H02K 53/00* (2013.01); *H02K 16/00* (2013.01); *H02K 49/10* (2013.01)

(58) Field of Classification Search
CPC ... H02K 49/104; H02K 53/00; H02K 49/102
USPC .......................................... 310/152, 80, 103
See application file for complete search history.

(56) References Cited

U.S. PATENT DOCUMENTS

| 2,745,027 A * | 5/1956 | Williford, Jr. ......... H02K 49/10 310/103 |
| 2,921,468 A * | 1/1960 | Treff ......................... G01F 3/12 310/104 |
| 3,935,487 A | 1/1976 | Czerniak |
| 4,179,633 A | 12/1979 | Kelly |
| 4,196,365 A | 4/1980 | Presley |
| 4,517,477 A | 5/1985 | Pankratz |
| 4,598,221 A | 7/1986 | Lawson et al. |
| 5,712,519 A * | 1/1998 | Lamb ................... H02K 49/046 310/103 |
| 6,274,959 B1 | 8/2001 | Uchiyama |
| 6,433,452 B1 | 8/2002 | Graham |
| 6,455,975 B1 | 9/2002 | Raad et al. |
| 6,811,106 B2 | 11/2004 | Aikawa |
| 8,288,904 B1 | 10/2012 | Bootsma, Jr. et al. |
| 2005/0116579 A1 | 6/2005 | Ohiwa et al. |
| 2008/0246361 A1* | 10/2008 | LaPoint ............... H02K 57/003 310/156.01 |
| 2010/0207472 A1* | 8/2010 | Atallah ................ H02K 49/102 310/103 |

* cited by examiner

*Primary Examiner* — Thanh Lam

(57) ABSTRACT

Apparatus for coupling magnetic forces into motive force includes a spinner shaft on which a helical array of magnets is mounted and a magnetic power bed. The magnetic power bed includes first and second magnetic boost elements configured to interact magnetically with the helical array of magnets to cause the spinner shaft to rotate as the helical array of magnets passes between the first and second magnetic boost elements. the first magnetic boost element includes two magnets separated by a magnetically responsive material and the second magnetic boost element includes a single magnet, thereby defining a tri-field magnetic flux within the magnetic power bed. The magnetic power bed may further include an auxiliary power bed that interacts with the first and second magnetic boost elements and the helical array. The apparatus may include two or more magnetic power bed with one or more magnetic field shunt bridges extending between the magnetic power beds.

33 Claims, 20 Drawing Sheets

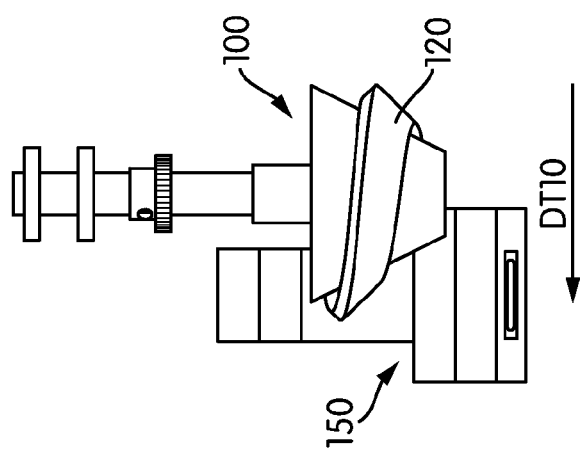
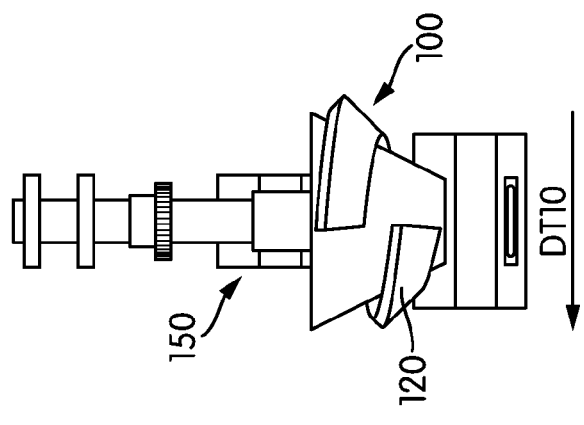
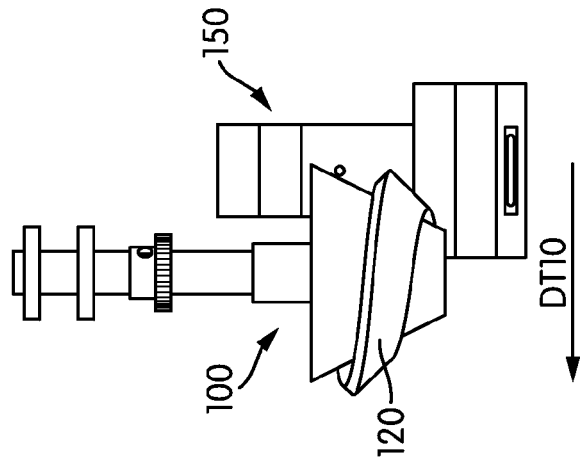
FIG. 2A
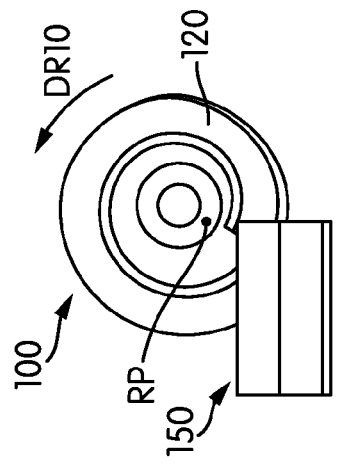
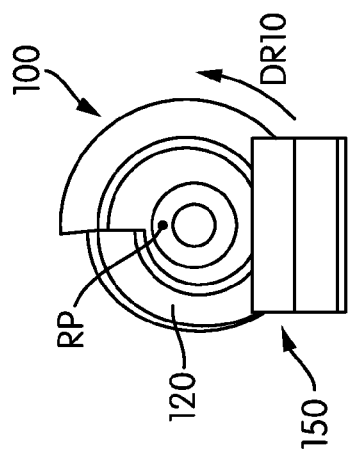
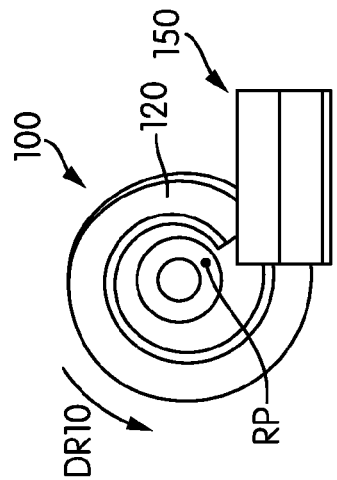
FIG. 2B
FIG. 2C

DEVICES AND METHODS FOR MECHANICALLY COUPLING MAGNETIC FIELD INDUCED MOTION

PRIORITY CLAIM

This application claims the benefit under 35 U.S.C. §119(e) of U.S. Provisional Application No. 61/713,129 filed Oct. 12, 2012, the disclosure of which is hereby incorporated by reference in its entirety.

BACKGROUND

1. Field of the Invention

The present invention relates to devices and structures for mechanically coupling forces induced by interacting magnetic fields into motive forces which may be coupled to a generator or other load. The present invention further relates to magnetic coupling units having particular dynamic arrangements.

2. Discussion of Related Art

It is recognized in the art that magnets interact with attractive and repulsive forces and that these forces can be used to perform useful work. Such work may include rotation of a shaft and linear movement of a mass. Magnetic motors illustrating this principle are disclosed, for example, in U.S. Pat. Nos. 6,274,959, 4,598,221, 4,196,365, and 4,179,633.

A driving apparatus disclosed in U.S. Pat. No. 6,274,959 has a rotatable disk with a magnet alley and an arrangement of peripheral permanent magnets. A reciprocal device also has a magnet alley that includes reciprocating permanent magnets which interact with the peripheral permanent magnets. Each reciprocating magnet is movable between two positions to attract and repel a peripheral permanent magnet as it rotates in proximity to the reciprocating magnet.

U.S. Pat. No. 4,598,221 discloses a permanent magnet motion conversion device having a ring stator with stator magnets aligned along its circumference and a rotor with permanent magnets. The rotor magnets rock about an axis as the rotor turns.

U.S. Pat. No. 4,196,365 discloses a magnetic motor having a shaft mounted rotating disc on which are mounted three permanent magnets oriented and spaced radially. A stationary bracket has two permanent magnets mounted in proximity to the disc such that the magnetic fields of the bracket magnets and the rotor magnets can interact. The bracket is attached to a reciprocating device which changes the distance of the bracket magnets to the rotor in relation to the rotation of the rotor.

U.S. Pat. No. 4,179,633 discloses a permanent magnet wheel drive having a flat wheel containing peripherally mounted identical magnet segments and a concentric magnetic driving device having multiple pairs of identical magnet segments mounted on rockers.

Common to each of these prior art patents are elements which mechanically reciprocate or rock in an attempt to change the orientation of a magnetic field or to block or allow extension of a magnetic field so as to achieve productive magnetic field interactions and avoid unproductive magnetic field interactions. Such mechanically reciprocating and rocking elements create inefficiencies, reducing the amount of work which may be performed. Moreover, such elements increase the complexity of the devices, leading to high expense in their construction and maintenance. Such complexity also means that the devices are not effectively scalable, i.e., it is not effective to combine a multiplicity of such devices to perform greater amounts of work. Thus, it is a goal of the present invention to overcome the above stated disadvantages.

SUMMARY OF THE INVENTION

Aspects of the invention are embodied in an apparatus for coupling magnetic forces into motive force, the apparatus comprising a spinner arm and a magnetic power bed. The spinner arm comprises a helical array of magnets having a helical axis, a spinner arm shaft onto which the helical array of magnets is mounted, wherein the spinner arm shaft has a longitudinal axis that is coincident with the helical axis and wherein the spinner arm shaft is mounted so as to be rotatable about a first axis of rotation coinciding with its longitudinal axis and to be rotatable about a second axis of rotation that is transverse to the longitudinal axis. The magnetic power bed comprises a first magnetic boost element and a second magnetic boost element. The first and second magnetic boost elements are positioned with respect to the spinner arm such that at least a portion of the helical array of magnets will pass between the first and second magnetic boost elements as the spinner arm rotates about the second axis of rotation. The helical array of magnets and the first and second magnetic boost elements are cooperatively arranged so that magnetic interaction between the helical array of magnets and the first and second magnetic boost elements causes the spinner arm and the helical array of magnets to rotate about the first axis of rotation as at least a portion of the helical array of magnets passes between the first and second magnetic boost elements. The first and second magnetic boost elements define a tri-field arrangement of magnetic flux whereby the first magnetic boost element comprises two magnetic blocks separated by a magnetically-responsive material and the second magnetic boost element comprises a single magnetic block.

According to further aspects of the invention the first magnetic boost element comprises a crescent shaped magnet array including a first arc-shaped magnetic block and a second arc-shaped magnetic block with a steel bar disposed between the first and second arc-shaped magnetic blocks.

According to further aspects of the invention the crescent shaped magnet array further comprises a first steel shunt element disposed on an end of the first arc-shaped magnetic block opposite the steel bar and a second steel shunt element disposed on an end of the second arc-shaped magnetic block opposite the steel bar. The shunts may be wedge shaped.

The first and second arc-shaped magnetic blocks may each comprises a single integral magnet and may comprise Neodymium.

According to further aspects of the invention, the second magnetic boost element comprises a booster field magnet comprising a single magnetic block.

The magnetic block of the booster field magnet may comprise a single, integral magnet and may comprise Neodymium.

According to further aspects of the invention, the booster field magnet further comprises steel shunt elements located on opposite ends of the magnetic block. The steel shunt elements may be wedge shaped.

According to further aspects of the invention, the auxiliary magnet array comprises a single magnetic block.

The magnetic block of the auxiliary magnet array may comprises a single, integral magnet and may comprise Neodymium.

According to further aspects of the invention, the auxiliary magnet array further comprises steel shunt elements located on opposite ends of the magnetic block. The steel shunt elements may be wedge shaped.

According to further aspects of the invention, the apparatus further comprises a secondary magnetic power bed axially displaced from the magnetic power bed with respect to the second axis of rotation. The secondary magnetic power bed comprises a first magnetic boost element and a second magnetic boost element. The first and second magnetic boost elements of the secondary magnetic power bed are positioned with respect to the spinner arm such that at least a portion of the helical array of magnets will pass between the first and second magnetic boost elements of the secondary magnetic power bed as the spinner arm rotates about the second axis of rotation. The helical array of magnets and the first and second magnetic boost elements of the secondary magnetic power bed are cooperatively arranged so that magnetic interaction between the helical array of magnets and the first and second magnetic boost elements of the secondary magnetic power bed causes the spinner arm and the helical array of magnets to rotate about the first axis of rotation as at least a portion of the helical array of magnets passes between the first and second magnetic boost elements of the secondary magnetic power bed. The first and second magnetic boost elements of the secondary magnetic power bed define a tri-field arrangement of magnetic flux whereby the first magnetic boost element comprises two magnetic blocks separated by a magnetically-responsive material and the second magnetic boost element comprises a single magnetic block.

According to further aspects of the invention, the helical array of magnets comprises a first row of magnets and a second row of magnets, both extending along a helical path.

According to further aspects of the invention, each of the magnets of the first row of magnets is arranged at an angle with respect to each of the magnets of the second row of magnets.

The magnets of the first and second rows of magnets may be mounted on a helical mounting backing.

According to further aspects of the invention, the apparatus of claim further comprises a hub within which the spinner arm shaft is mounted and configured to allow rotation of the spinner arm shaft about the first axis of rotation.

According to further aspects of the invention, the apparatus of claim further comprises a stator plate on which the magnetic power bed is mounted; and a shaft extending perpendicularly from the stator plate and having a longitudinal axis coincident with the second axis of rotation. The hub is coupled to the perpendicular shaft so as to be rotatable about the second axis of rotation.

According to further aspects of the invention, the pole face of each magnet of the helical array of magnets is parallel to a pole face of a magnetic block of the first or second magnetic boost element during at least a portion of the time the helical array of magnets is passing between the first and second magnetic boost elements.

According to further aspects of the invention, the apparatus includes a second spinner arm and a second magnetic power bed.

According to further aspects of the invention, the apparatus further comprises a shunt bridge extending between the first and second magnetic power beds and configured to provide a pathway for magnetic flux to flow from the first magnetic power bed to the second magnetic power bed.

According to further aspects of the invention, the shunt bridge comprises a plurality of magnets arranged side-by-side with alternating polarities.

According to further aspects of the invention, the shunt bridge further comprises a steel shunt element located at each opposite end of the shunt bridge.

According to further aspects of the invention, the apparatus comprises two shunt bridges extending between the first and second magnetic power beds and disposed on diametrically opposed sides of the second axis of rotation.

BRIEF DESCRIPTION OF THE DRAWINGS

FIGS. 2A-2C illustrate a relationship between a spinner arm translational position and helical array angular position in accordance with an aspect of the present invention.

DETAILED DESCRIPTION OF PREFERRED EMBODIMENTS

Figure 1:
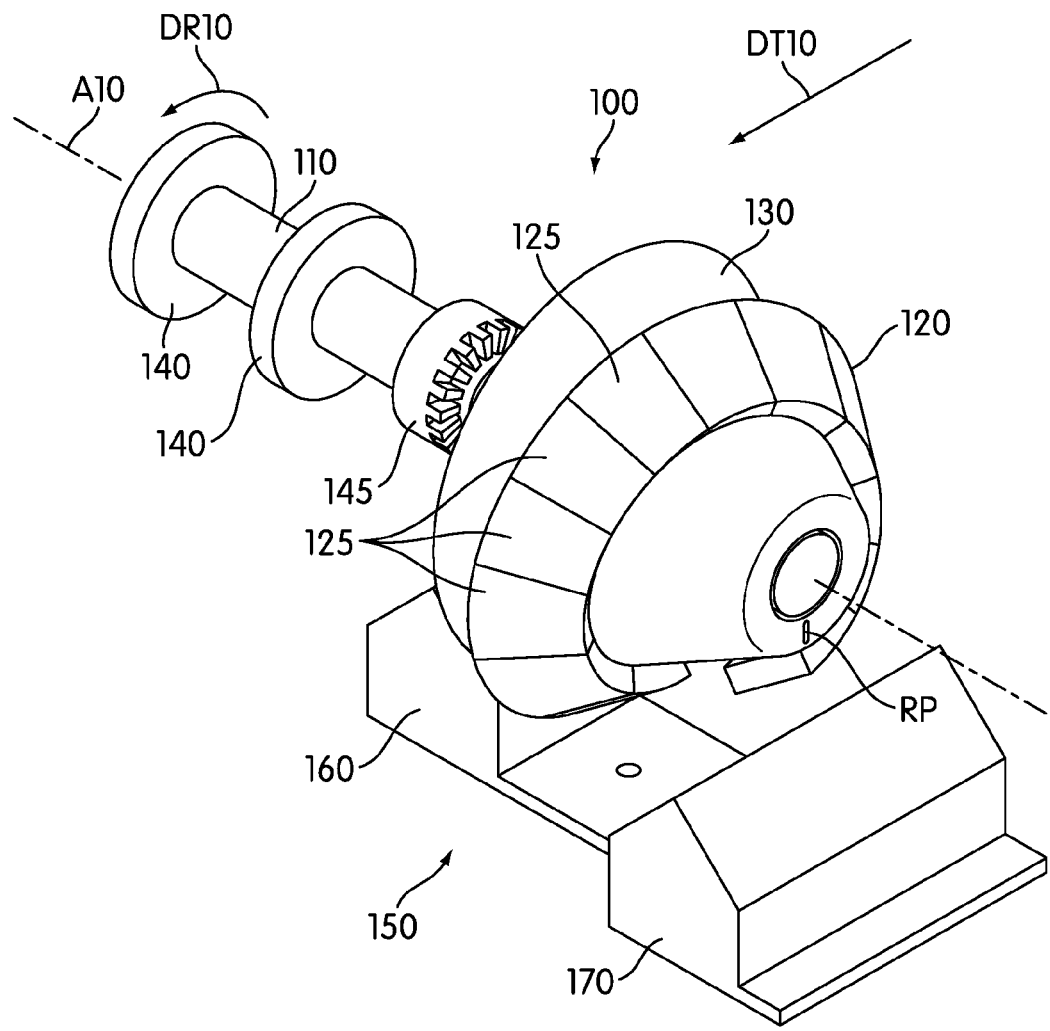
FIG. 1 illustrates an exemplary arrangement of magnets in accordance with an aspect of the present invention.

Unless defined otherwise, all terms of art, notations and other technical terms or terminology used herein have the same meaning as is commonly understood by one of ordinary skill in the art to which this disclosure belongs. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, etc., are used for convenience in referring to such component, apparatus, location, feature, or a portion thereof in the drawings and are not intended to be limiting.

Furthermore, unless otherwise stated, and specific dimensions mentioned in this description are merely representative of an exemplary implantation of a device embodying aspects of the invention and are not intended to be limiting.

With reference to FIG. 1, a spinner arm 100 and power bed 150 are illustrated in accordance with one embodiment of the invention. Spinner arm 100 is constructed to spin about an axis A10 defined by shaft 110 in direction DR10. Spinner arm 100 includes a tapered helical array 120 of spinner magnets 125. Tapered helical array 120 may comprise substantially a single revolution around the spinner arm axis and may be mounted on a support structure such as cone 130. Spinner arm 100 may further include bearings 140 and pinion gear 145. FIG. 1 further illustrates a power bed 150. In one embodiment, this power bed 150 may include two arrays of magnets, inner array 160 and outer array 170. In other embodiments, power bed 150 may include one magnet array or more than two magnet arrays.

In one embodiment, shaft 110 is cylindrically shaped and constructed of non-ferrous material, preferably aluminum, with a standard stock diameter readily available from suppliers. In a preferred embodiment, shaft 110 is black oxide plated, preventing pitting and oxidation. Bearings 140 may be made of stainless steel and in sizes readily available from suppliers.

Spinner arm 100 and power bed 150 are mounted relative to each other such that spinner arm 100 is able to move in translational direction DT10 while power bed 150 is relatively fixed. The spinner magnets 125 in tapered helical array 120 and the magnets in power bed 150 interact to induce spinner arm 100 to move in translational direction DT10. At the same time, spinner arm 100 and power bed 150 are mounted relative to each other such that shaft 110 rotates in direction DR10 about axis A10 as the entire spinner arm 100 assembly moves in translational direction DT10. For reference, reference point RP is shown in FIG. 1 on the apex of cone 130, indicating a relative angular orientation of tapered helical array 120 of 0° about axis A10.

FIGS. 2A-C illustrate, with corresponding plan and elevation views, the approximate angular orientations of tapered helical array 120 as spinner arm 100 approaches, transits, and exits power bed 150, for one embodiment. In this embodiment, as illustrated in FIG. 2A, spinner arm 100 moves translationally in direction DT10 relative to power bed 150 and tapered helical array 120 has a relative angular orientation of approximately −22° as it becomes proximal to power bed 150. As spinner arm 100 continues to move translationally in direction DT10, transiting through power bed 150, it is rotating in direction DR10, advancing the angular orientation of tapered helical array 120 to approximately 180° at a mid-transit point as illustrated in FIG. 2B. As the rotation and translation of spinner arm 100 continues and it exits power bed 150, the angular orientation of tapered helical array 120 is approximately 22° as illustrated in FIG. 2C.

Figure 3A:
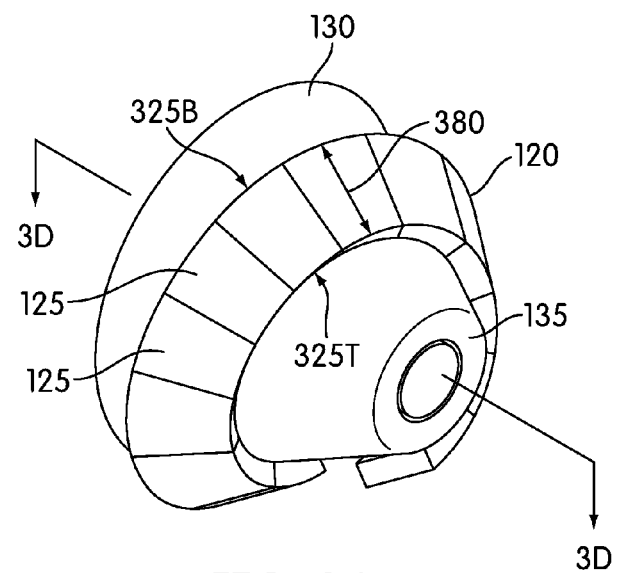
FIGS. 3A-3D illustrate embodiments of a tapered helical array of magnets in accordance with an aspect of the present invention.

As illustrated in FIG. 3A, tapered helical array 120 is comprised of spinner magnets 125 mounted on cone 130. In one exemplary embodiment, cone 130 may be in the shape of a right circular cone with a truncated apex 135. Cone 130 may be composed of a non-magnetic, non-conductive material such as molded thermoplastic. Plastics such as PVC, polycarbonate, thermoplastic resins, and acrylics are preferred. Spinner magnets 125 are preferably rare earth magnets having similar high power flux and high coercive force to the magnets in power bed 150 (further described below). Magnets made of neodymium iron boron (NdFeB), samarium cobalt (SmCo), or ferrites are preferred. In exemplary embodiments, 45 MGOe NdFeB magnets or 28 MGOe SmCo magnets may be used.

Figure 3B:
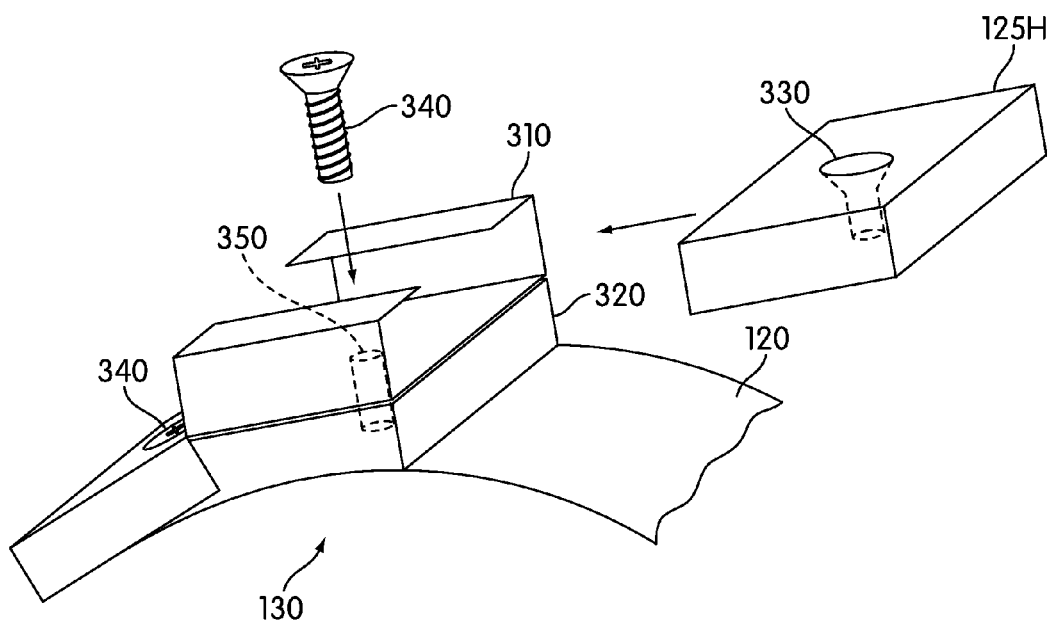

Each magnet 125 may be affixed to cone 130 using a high strength industrial adhesive such as Loctite. Other methods, such as through-hole screws and brackets, may be used alone or in combination with each other and/or with the use of an adhesive. FIG. 3B illustrates an exemplary embodiment in which bracket 310 is mounted on cone 130 along the path of tapered helical array 120. Cone 130 may have an optional milled or molded base structure 320. Magnet 125H may be inserted in to bracket 310. Additionally, or independently, magnet 125H may include a counter sunk through-hole 330 through which flat head screw 340 may be inserted, fastening magnet 125H to cone 130 through cone through-hole 350. In one embodiment, flat head screw 340 is steel. In another embodiment, a flat head steel pop rivet may be substituted for flat head screw 340.

Spinner magnets 125 may be cuboid in shape, having relative height, width, and depth of approximately 1, 1, and 0.25, respectively. In another embodiment, the magnets are rectangular in shape and have a taper running along the length through the thickness of the magnet dimension, the taper having, for example, a 2-1 ratio. In one embodiment, spinner magnets 125 are polarized such that the magnetic poles are perpendicular to the large faces. In one embodiment, spinner magnets 125 are mounted on cone 130 with their south poles oriented outward and directed away from cone 130. In another embodiment, the large faces of spinner magnets 125 are isosceles trapezoids having a narrower end 325T and broader end 325B and are mounted with narrower end 325T oriented in the direction of apex 135, as illustrated in FIG. 3A. Spinner magnets 125 are mounted to cone 130 such that tapered helical array 120 is formed. In one exemplary embodiment, tapered helical array 120 comprises approximately 1 revolution around cone 130 and may have a pitch (i.e., spacing of successive revolutions relative to the axis) of approximately the height of one magnet as in, for example, magnet height 380. In another embodiment the pitch is as much as eight. Tapered helical array 120 is tapered, i.e., its radial distance from its axis is a linear function of its position along the axis, such that it may follow the contour of cone 130.

Figure 3C:
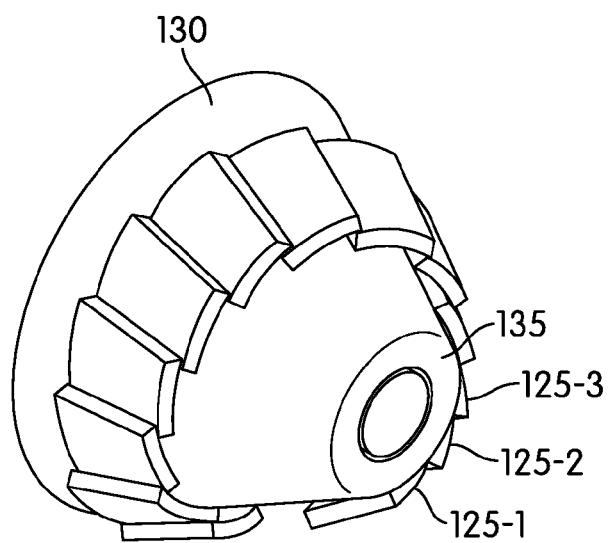

In a preferred embodiment, as illustrated in FIG. 3C, the spinner magnets 125 of tapered helical array 120 are mounted in an overlapping fashion with approximately 2-5% of the magnet faces overlapped. In this embodiment, as in the arrangement shown in FIG. 3A, the large faces of spinner magnets 125 may be trapezoidal. However, the large width of the trapezoid is oriented in the direction of apex 135. Tapered helical array 120 may be assembled by placing a first spinner magnet 125-1 at the apex 135, lapping a leading edge of second spinner magnet 125-2 on the trailing edge of spinner magnet 125-1, lapping a leading edge of third spinner magnet 125-3 on the trailing edge of spinner magnet 125-2, and so on, following the path of a tapered helix to the base of cone 130. Alternatively (not shown), a first spinner magnet may placed at the base of the cone, followed by lapping a trailing edge of a second spinner magnet on the leading edge of the first spinner magnet, followed by lapping a trailing edge of a third spinner magnet on the leading edge of the second spinner magnet, and so on, following the path of a tapered helix to the apex 135.

Figure 3D:
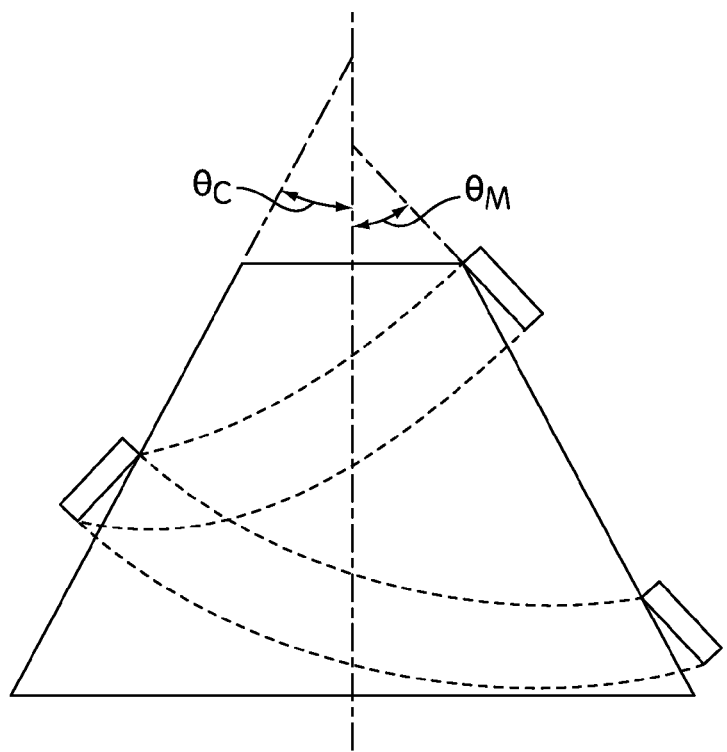

As illustrated in FIG. 3D, depicting cross section D-D of FIG. 3A through the axis of the cone 130, a cross sectional edge of cone 130 forms angle $\theta_C$ with the axis of cone 130 and spinner magnets 125 form angle $\theta_M$ with the axis of cone 130. In a preferred embodiment $\theta_M$ is constant along the length of tapered helical array 120, may be up to 60°, and is most preferably approximately 45°. Angle $\theta_C$ is generally equal to or smaller than $\theta_M$.

In other aspects, spinner magnets 125 may be attached to spinner shaft 110 via a support structure other than cone 130. For example, spinner magnets 125 can be mounted on a series of supports emanating radially (not shown) from spinner shaft 110.

Figure 4A:
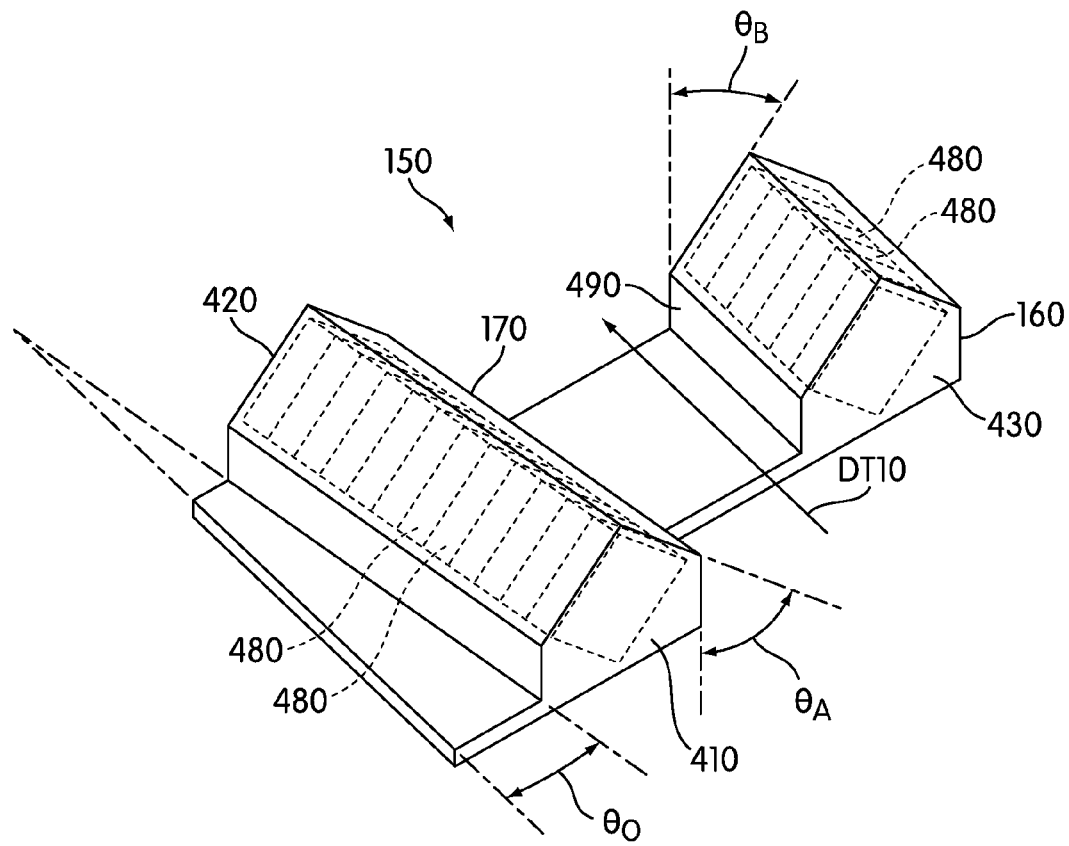
FIGS. 4A-4E illustrate embodiments of power bed magnet arrays in accordance with an aspect of the present invention.

As illustrated in FIG. 4A, power bed 150 is comprised of two arrays of magnets: inner array 160 and outer array 170. In one exemplary embodiment, inner array 160 consists of 6 power bed magnets 480 and outer array 170 consists of 12 power bed magnets 480. In other embodiments inner array 160 may have 3-25 magnets and outer array 170 may have 6-50 magnets. Power bed magnets 480 may be cuboid in shape and have relative dimensions of 1, 1, and 0.25. In other embodiments (not shown), power bed magnets 480 may be triangular, trapezoidal (similar to magnets 125 illustrated in FIG. 3A), or arc segments having a taper running across the width. Power bed magnets 480 are preferably rare earth, including NdFeB, SmCo and hard ferrites of grades C 5 and C 8, and have high power flux and high coercivity. Their magnet poles are preferably oriented perpendicularly to their large faces. In preferred embodiments of each array, inner array 160 and outer array 170, the poles of power bed magnets 480 are oriented in a common direction and typically substantially parallel to DT10; when the leading end 410 of outer array 170 is north in polarity, the leading end 430 of inner array 160 is south in polarity.

Power bed 150 optionally comprises power bed housing 490, which encapsulates power bed magnets 480 in a non-magnetic, non-ferrous, and non-conductive material. Suitable materials include PVC, polycarbonate, thermoplastic resins, and acrylics.

In one embodiment, the power bed magnets 480 in outer array 170 may be oriented to have angle $\theta_A$ so as to create an array face which would be substantially parallel to tapered helical array 120, as illustrated in FIG. 4A. In a preferred embodiment, power bed magnets 480 in inner array 160 are oriented such that $\theta_B$ is approximately the same as $\theta_A$. In one embodiment, inner array 160 and outer array 170 are oriented substantially in parallel with the direction of travel DT10 of spinner arm 100. In another embodiment, outer array 170 is angled with angle $\theta_O$ such that leading end 410 is closer to inner array 160 than trailing end 420. In a preferred embodiment, angle $\theta_O$ may be approximately 10-15°.

Figure 4B:
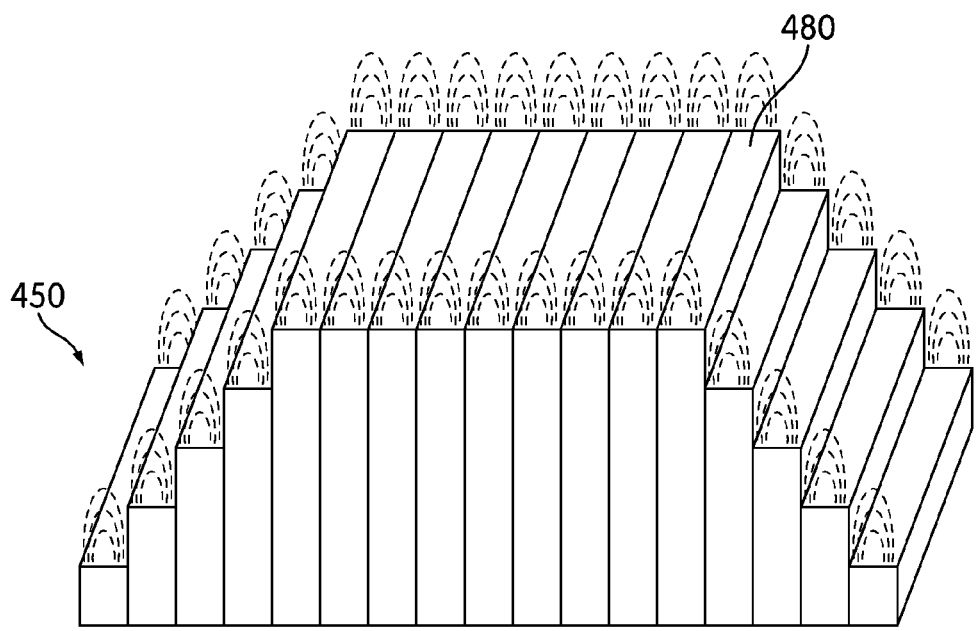
Figure 4C:
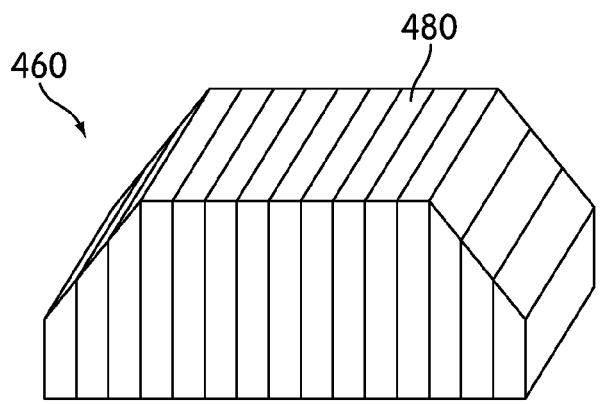

In alternative embodiments of outer array 170, the power bed magnets 480 may be arranged as stepped magnet arrays such as stepped array 450, as illustrated in FIG. 4B or angled magnet arrays such as angled array 460, as illustrated in FIG. 4C. These alternative embodiments allow the magnetic flux to be gradually increased in height and/or strength from one end to a peak in the center of the array and then decreased from the center to the other end. In another embodiment illustrated in FIG. 4E, shunt blocks 495 are added on each side of the array. Shunt blocks 495 may be employed to shunt flux leakage and may be steel blocks, i.e., a non-magnetic, but magnetically responsive material.

Figure 4D:
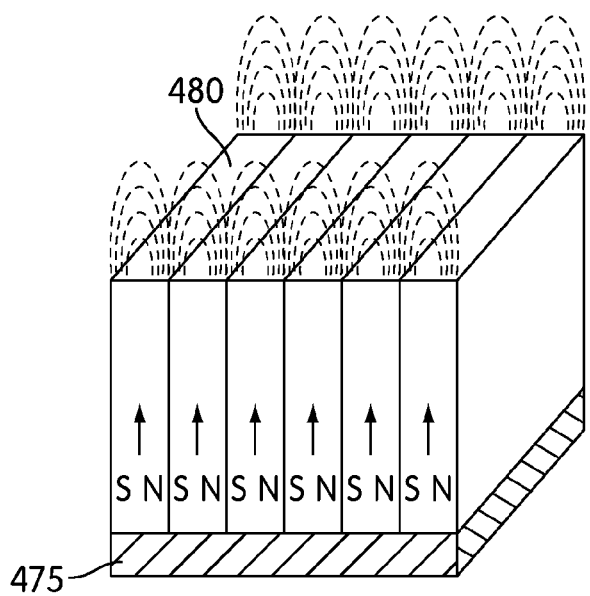
Figure 4E:
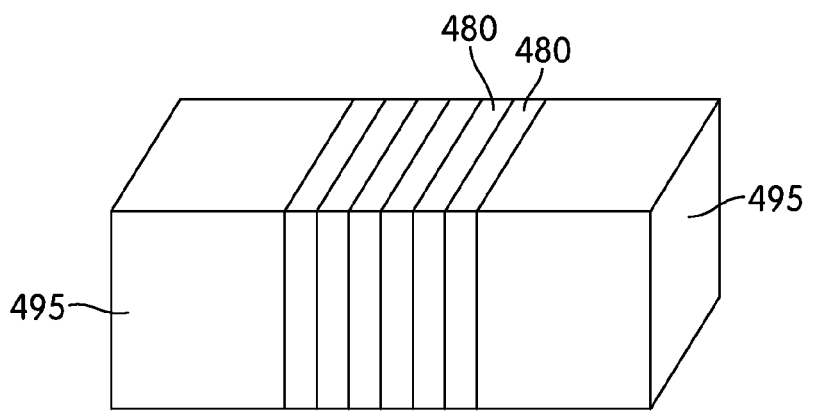

As illustrated in FIG. 4D, the poles of power bed magnets 480 are oriented to provide alternating north and south polarities, creating a narrow flux path on each power bed magnet 480, having a maximum concentration of flux lines on each magnet and narrow peaks with sharp bands. The stepped array 450 (illustrated in FIG. 4B) and angled array 460 (illustrated in FIG. 4C) create a lower flux path at the leading and trailing ends of the arrays. In these preferred embodiments, the power bed 150 creates a specific flux path that smoothes the entry of and decreases the entry resistance to spinner arm 100 on leading end 420 and repels the spinner arm on the trailing end 410 as the spinner arm 100 rotates in the clockwise rotation about its axis.

In other embodiments, the power bed magnets 480 may be mounted on a low carbon steel plate 475 to increase magnetic flux at the top of the array, as illustrated in FIG. 4D. Low carbon steel plate 475 may be sized to match an array's footprint and mated to an inner and/or outer array of magnets such as, for example, stepped array 450 or angled array 460.

Power bed 150 may be mounted on a substrate (not shown) with non-magnetic type fasteners (not shown) such as stainless steel or brass screws instead of non-magnetic rivets. Screws are preferred because they permit easy assembly and disassembly as well as ease of alignment of a power bed 150 on a substrate.

In accordance with one configuration of an embodiment of the invention, the spinner arm 100 is initially not moving relative to the power bed 150. An initial external force, not shown, is applied to the spinner arm 100 so that it moves in the translational direction towards power bed 150, overcoming any repelling interaction between the spinner arm and power bed 150. Spinner arm 100 rotates about its axis as it moves in relation to power bed 150, dynamically reconfiguring the magnetic interaction between spinner arm 100 and power bed 150. Once proximal to power bed 150, a repelling force pushes spinner arm 100 away from power bed 150 in the translational direction, the repelling force being greater than the initial force.

In accordance with scaled embodiments of the invention, pluralities of spinner arms 100 and power beds 150 may be assembled into structures which scale-up and couple the translational movement of the multiple spinner arms into linear or rotational movement of a load.

Figure 5:
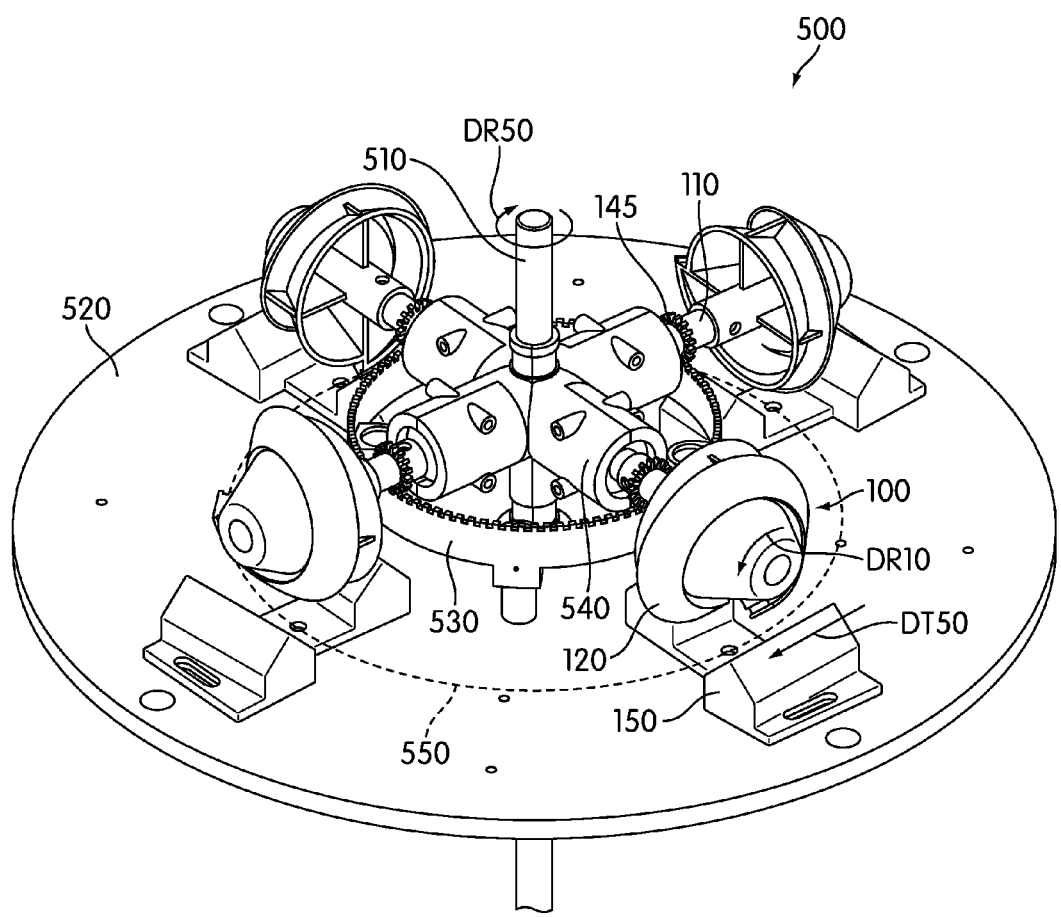
FIG. 5 illustrates a stator plate assembly in accordance with an aspect of the present invention.

FIG. 5 illustrates one such scaled embodiment of the invention comprising a stator plate assembly 500 that includes a substrate or stator plate 520 to which multiple power beds 150 are fastened. In this exemplary embodiment, a pinion rack 530 is affixed to the stator plate 520 on which ride the pinion gears 145 of each spinner arm 100. Spinner arm 100 is also coupled in hub 540 via bearings 140 (see FIG. 1) so that the spinner arm may rotate about its axis. In the embodiment illustrated in FIG. 5, 4 power beds 150 are affixed to stator plate 520 and 4 spinner arms 100 are coupled to hub 540. The power beds 150 define a circular power track 550 with power beds 150 spaced approximately 90° apart. The hub 540 defines four axes about which spinner arms 100 may rotate; the axes lie in a plane parallel to a plane defined by stator plate 520. As shown in FIG. 5, the axes may be spaced 90° apart. Hub 540 is affixed to stator shaft 510 such that the rotation of hub 540 about the axis defined by stator shaft 510 causes stator shaft 510 to rotate.

Hub 540 may optionally be made in the shape of a cube with bores on each side to accommodate bearings for each spinner arm 100. Hub 540 may be constructed of non-magnetic, non-ferrous materials such as molded plastics, brass, stainless steel Austenitic types, for example, types 304 or 316, or aluminum. In a preferred embodiment, hub 540 is constructed of aluminum having oxide plating, providing easy machining, cost effectiveness, light weight, lower labor costs and non-oxidation.

The operation of this exemplary embodiment depicted in FIG. 5 is described as follows. In one configuration, spinner arms 100 are positioned an initial distance from corresponding power beds 150. An initial external force is applied to the system such that tapered helical array 120 and spinner arms 100 are advanced towards power beds 150, rotating hub 540 and shaft 510 clockwise in direction DR50. This rotation of spinner arms 100 around the axis defined by stator shaft 510 moves tapered helical arrays 120 translationally in direction DT50. As the hub 540 and spinner arms 100 assembly rotate about the stator shaft 510 axis, spinner arms 100 and shafts 110 are forced to rotate about their axes in direction DR10 due to the interaction between pinions 145 and rack 530. The rotation of spinner arm shafts 110 cause tapered helical arrays 120 to be angularly positioned relative to power beds 150 such that a magnetic repulsive force pushes the spinner arms 100 out of the power beds 150, with each spinner arm moving towards the next power bed in power track 550 such that the similar magnetic interactions occur between the subsequent power bed and the spinner arm. The length of the power beds 150 and the changing orientations of the magnets comprising tapered helical arrays 120 cause spinner arms 100 to experience magnetic forces which, in aggregate, cause the rotation of hub 540 and stator shaft 510 about their axes.

Stator plate 520 is fixed so that stator shaft 510 may be coupled to a generator or other load such as a gear box, wheel, or fan. With the polar orientations of the spinner magnets 125 and array magnets 480 as discussed above, hub 540 tends to rotate in direction DR50, causing tapered helical arrays 120 to follow power track 550 in the direction DT50. In another embodiment, spinner magnets 125 could have an opposite orientation, tending to have the effect that hub 540 would rotate in a direction opposite to DR50.

In other embodiments, a circular configuration such as that shown in FIG. 5 may be modified to accommodate fewer or more power beds in a power track, such as, for example, eight power beds spaced 45° apart or three power beds spaced 120° apart. The circular configuration may further be modified to have fewer or more spinner arms, such as, for example, two spinner arms spaced 180° apart or eight spinner arms spaced 45° apart. In embodiments with fewer power beds, the arrays 160 and 170 of magnets 480 may be comprised of greater numbers of magnets 480 and the pinions 145 and rack 530 are geared such that the spinner arms 100 have fewer rotations about their axes per rotation of hub 540. In such embodiments, arrays 160 and 170 may approximate the curvature of the power track 550. In embodiments having greater numbers of power beds, the arrays 160 and 170 of magnets 480 may be comprised of fewer numbers of magnets 480 and the pinions 145 and rack 530 are geared such that the spinner arms 100 have more rotations about their axes per rotation of hub 540.

Moreover, in other embodiments, the circular configuration of FIG. 5 may be modified to have two or more concentric power tracks. In an exemplary such configuration, spinner arm 100 may be modified to have two tapered helical arrays 120 affixed to a single spinner shaft (not shown) such that one of the two tapered helical arrays interacts with an inner power track and the other with an outer power track. In such a configuration, the number and arrangement of power bed magnets may differ between the inner power track and the outer power track in order to compensate for the differing ratios of spinner rotation to spinner arm translational motion due to the differing circumferences of the power tracks. In another multi-concentric-track embodiment (not shown), coaxial spinners may rotate at different rates and have independent pinion racks. The number of power tracks per each stator plate assembly, the number of power beds per power track, the strength of magnets 480 and 125, and the number of spinners are among factors determining the torque and power of assembly 500.

Stator plate 520 may be made of a non-ferrous metal, preferably aluminum. Using aluminum as stator plate 520 prevents induction of the magnetic flux from power beds 150 into stator plate 520.

Pinion rack 530, in conjunction with pinion gear 145, provides for spinner 100 to rotate about its axis at a predetermined rate as the spinner arm 100 moves in a translational direction through a power bed 150. Pinion gear 145 may optionally be fitted with a set screw and/or shaft key (not shown), permitting the spinner arm 100, in a maintenance operation, to be rotated about its axis without advancing the spinner arm 100 in a translational direction relative to pinion rack 530. This allows fine-tuning of initial configurations, including the angular position of the tapered helical array 120 about its axis in relation to its translational displacement relative to a power bed 150. Such fine-tuning permits an optimal orientation, for example minimizing repulsive forces between the tapered helical array 120 and power bed magnets 480 to permit lower force translational movement of the spinner arm 100 towards the power bed 150 and to translationally push the spinner arm 100 out at the proper point with greater force. The pinion rack to pinion gear ratio may be selected in relation to the number and length of power beds 150 on stator plate assembly 500.

Figure 6:
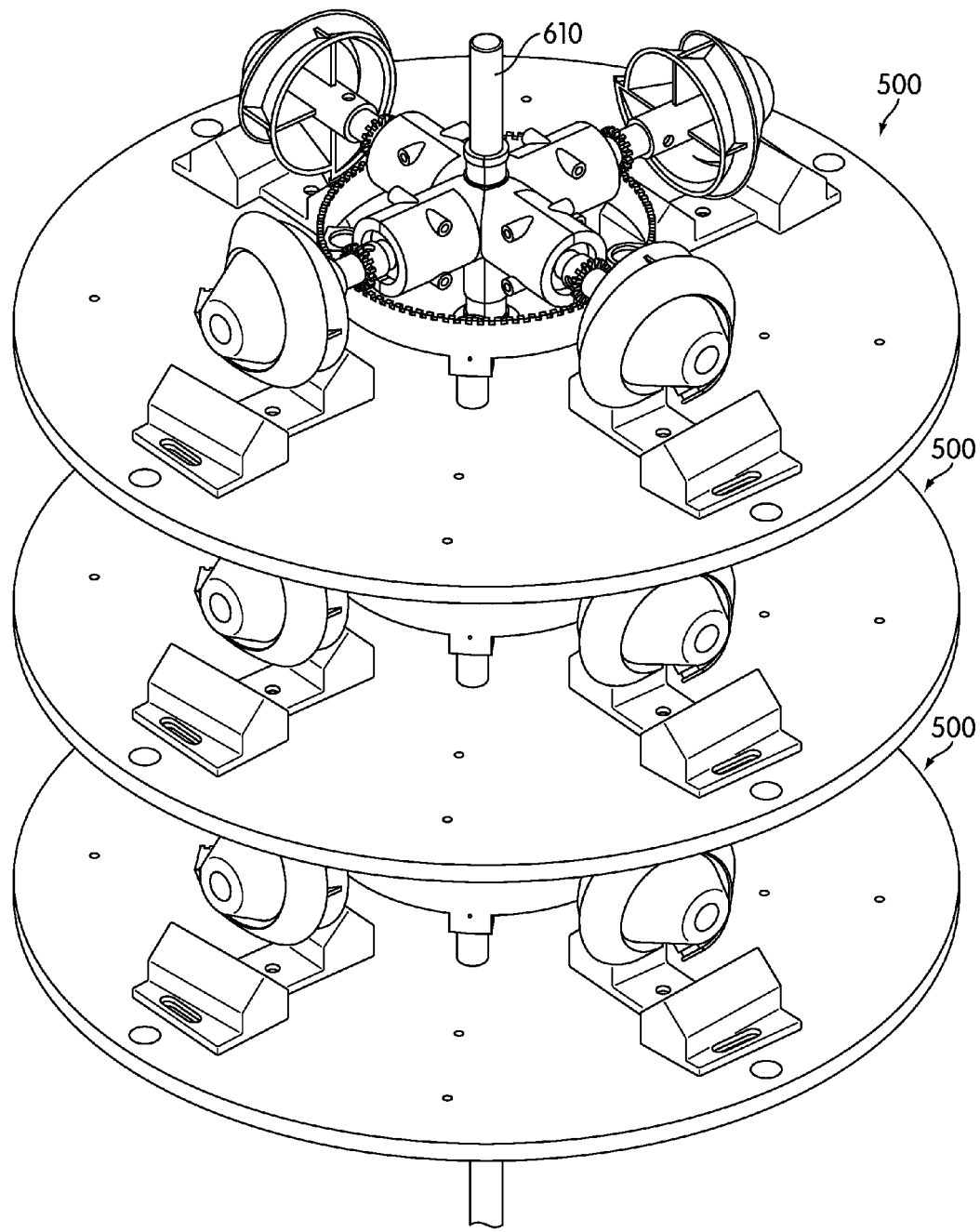
FIG. 6 illustrates a tower-type assembly of stator plate assemblies.

Additionally, as shown in FIG. 6, the stator plate assemblies 500 can be stacked on top of each other and coupled to a single stator shaft 610, further scaling up available torque.

Figure 7:
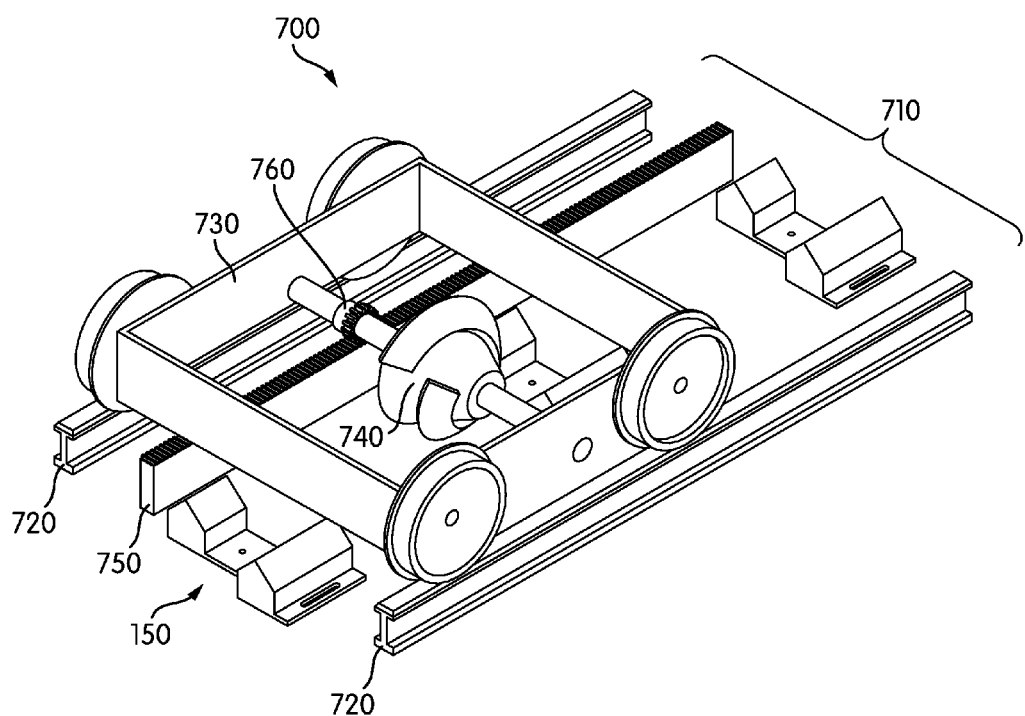
FIG. 7 illustrates a linear assembly in accordance with an aspect of the present invention

FIG. 7 illustrates another scaled embodiment of the invention. In this embodiment, multiple power beds 150 are spaced along a track 710 defined by rails 720 on which is mounted a car 730. Spinner arm 740 may be mounted on car 730 so that spinner arm 740 may interact with the power beds 150 spaced along the track. Track 710 also may include one or more racks 750 on which spinner arm pinion 760 may ride. Thus, spinner arm 740 may be configured to rotate and have the desired angular orientation with respect to their displacement from the power beds 150. In an alternate embodiment, more than one spinner arm 740 may be mounted on car 730.

Most of the parts are of non-ferrous material and of light weight to reduce the drag/torque and loss of magnetic flux and improve the output of the unit. The use of high power flux magnets helps to keep a unit in operation at an ambient temperature. This in turn reduces the maintenance and increases the output and longevity of the unit.

Figure 8:
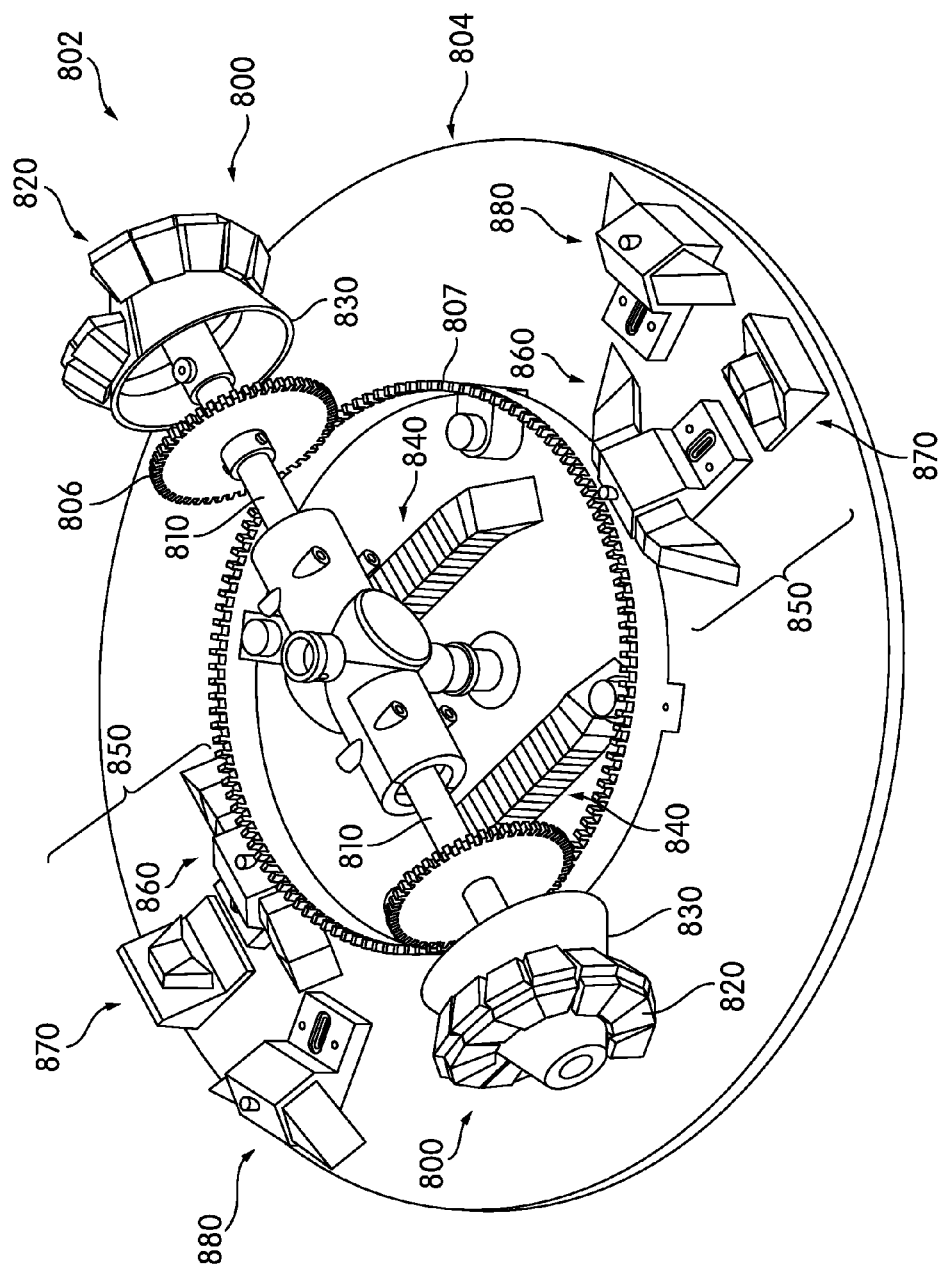
FIG. 8 is a top perspective view of a stator plate assembly embodying aspects of an alternate embodiment of the invention.
Figure 9:
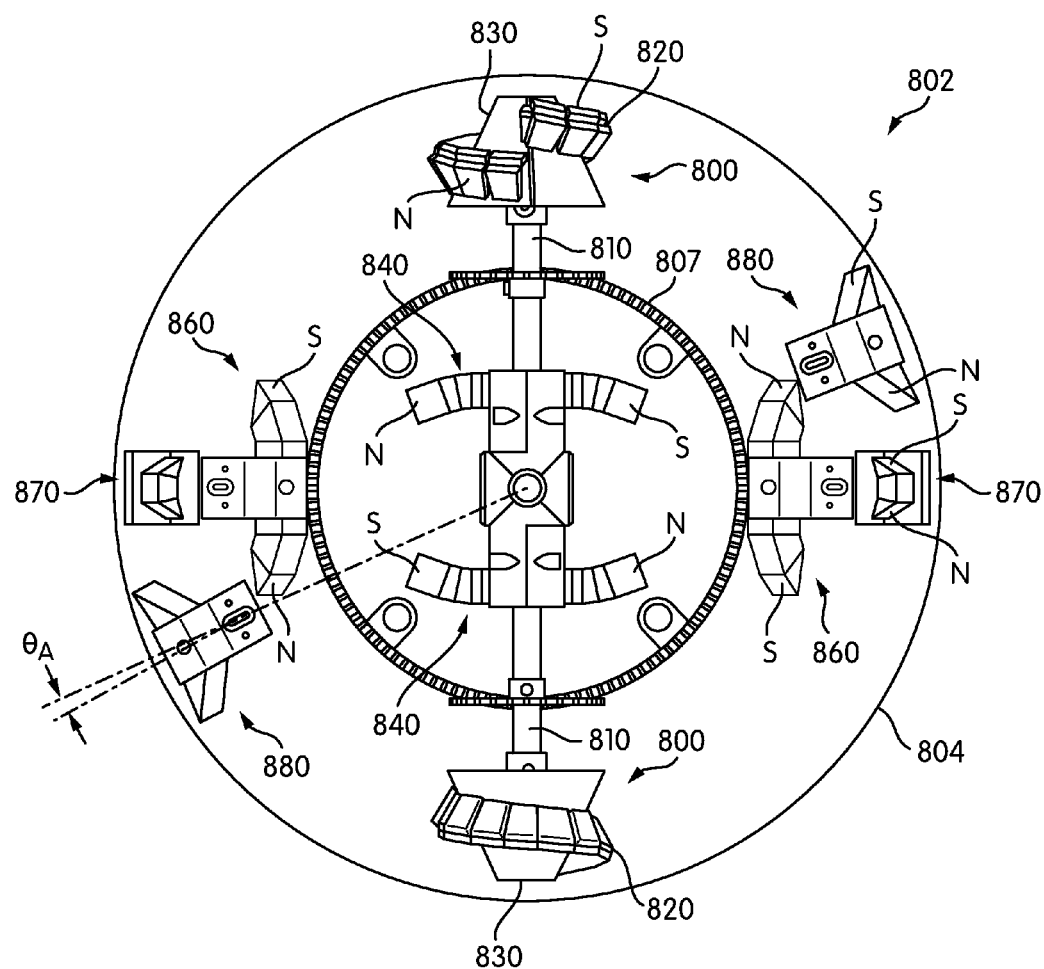
FIG. 9 is a top plan view of the stator plate assembly of FIG. 8.

An alternate embodiment of a stator plate assembly 802 is shown in FIGS. 8 and 9. The stator plate assembly 802 includes a stator plate 804 two (or more) spinner arms 800, each including a spinner shaft 810, a spinner cone 830, and a helical magnet array 820. The spinner shafts 810 are mounted within hubs so as to be rotatable about a first axis of rotation coinciding with the longitudinal axes of the shafts. In addition, the hubs are mounted to a center stator shaft extending perpendicularly from the stator plate 804, so that the spinner shafts 802 are also rotatable with respect to the stator plate 804 about second axis of rotation coinciding with the axis of the perpendicular shaft.

The assembly 802 includes one or more power beds 850, each comprising a number of magnetic boost elements, such as a crescent shaped magnet array 860, a booster field magnet 870, and an auxiliary magnet bed 880. In the illustrated embodiment, the assembly 802 includes two power beds 850, and the crescent shaped magnet arrays 860 are located radially inwardly from the booster field magnets 870 and the auxiliary magnet beds 880, although the relative positions of the crescent shaped magnet arrays 860 and the booster field magnets 870 and the auxiliary magnet beds 880 could be reversed. In addition, the auxiliary magnet bed 880 may be positioned in front of (relative to the rotational direction of the spinner arm 800) the associated booster field magnet 870, or the auxiliary magnet bed 880 may be positioned behind the associated booster field magnet 870 depending on the desired interaction between the auxiliary booster magnet 880 and the booster field magnet 870. In some embodiments, an auxiliary magnet bed 880 may be positioned in front of and behind the booster field magnet 870.

As described above, a pinion gear 806 is provided on the shaft of each spinner arm 800 and interacts with a pinion rack 807. The diameter of the gear 806 determines the speed with which the spinner arm 800 rotates and the angular extent of the magnetic boost field applied to the spinner cone 830 as the spinner arm 800 moves through the power bed 850. The smaller the pinion gear 806, the faster the spinner arm rotates, but the smaller the angular range of the boost field that is applied to the spinner cone 830 in relation to 360 degree movement around the plate 804.

Figure 13:
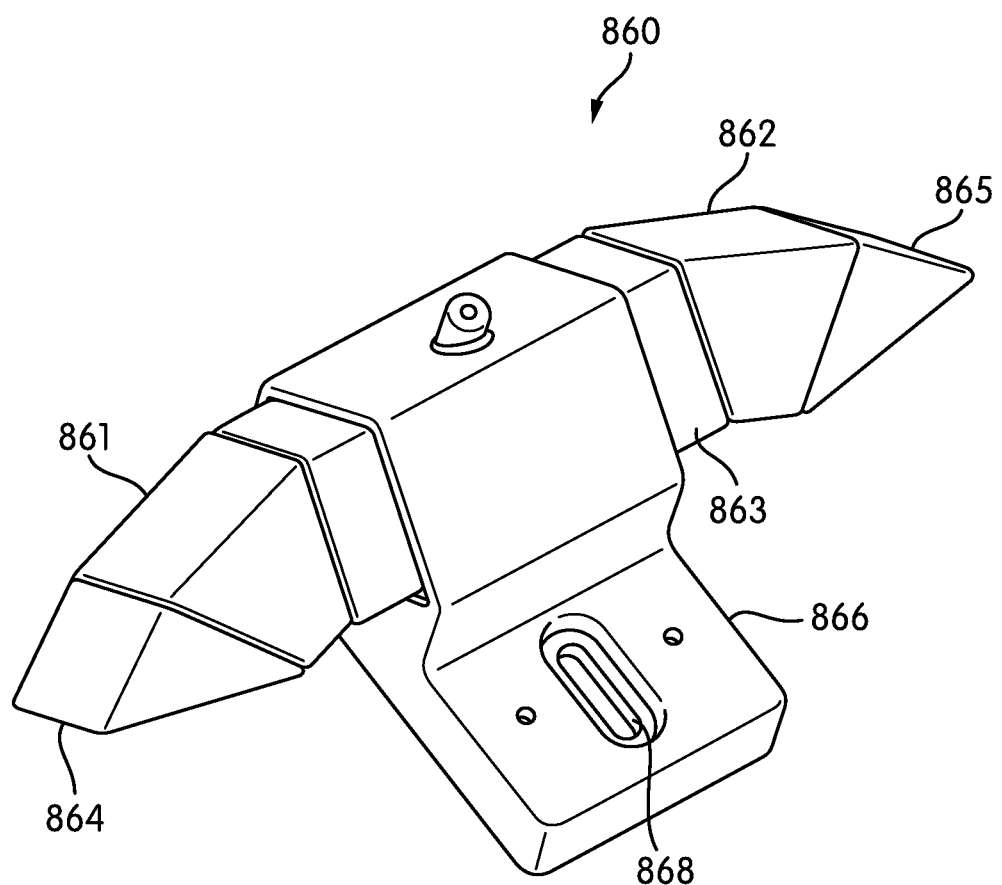
FIG. 13 is a perspective view of a crescent-shaped magnet array of an alternate embodiment of the invention.

Details of the crescent shaped magnet array 860 are shown in FIG. 13. Each crescent shaped magnet array 860 includes Neodymium Iron Boron (NdFeB) type arc-shaped magnets 861, 862 with one low carbon type square steel bar 863 (i.e., a non-magnetic, but magnetically responsive material) disposed between the magnets 861, 862. Magnets 861, 862 may each comprise a single magnet or a multiple magnets arranged with attracted polarities. By way of non-limiting example, each magnet 861, 862 may have an outside radius of 2 inches, an inside radius of 1 inch, a height of 1 inch, and an angular width of 30-60 deg. An exemplary size of the steel bar 863 is 1"×1"×2" long. The purpose of the steel bar 863 between the two arc shaped magnets 861, 862 is to dampen or reduce the magnetic flux as the spinner arms 800 approach the crescent shape power beds from either direction by shielding the flux between magnets 861, 862.

The magnets 861, 862 may be nickel coated and magnetized along the arc of each magnet with one North Polarity and one South Polarity at opposite ends of each other. The arc magnets 861, 862 of the crescent shaped power bed 860 are linked with the square steel bar 863 and may optionally include a steel wedges 864, 865 (wedge shape is optional; rectangular steel blocks may be substituted) on each end of the arc magnets 861, 862, respectively. Each crescent shaped magnet array 860 has South-Polarity and North-Polarity opposite of each other crescent shaped magnet array 860 at the tips of the steel wedges 864, 865. (See FIG. 9 showing exemplary polarities of the magnetic components for a stator plate assembly 802 configured to rotate the spinner arms in a counterclockwise direction. The polarities would be reversed for a stator plate assembly configured to rotate the spinner arms in a clockwise direction). The purpose of steel wedges 864, 865 at the ends of the arc magnets 861, 862 is to taper the magnetic flux pattern to a narrow path (i.e., dampen the magnetic field from magnets 861, 862 from escaping very far from magnets 861, 862) allowing much smoother approach for the spinner arms 800 by reducing the flux field and interaction of like poles between the magnets on the spinner cone 830 and the crescent shaped magnet array 860. Such interaction of the magnetic fields of the magnets of the spinner cone 830 and the crescent shaped magnet array 860 generates a force repelling movement of the spinner 800 into the power bed 850. Omitting the wedges 864, 865 will allow a larger magnetic field around the crescent shaped magnet array 860. The larger magnetic field will result in an even greater force repelling movement of the spinner 800 into the power bed 850, but will also result in a greater force rotating the spinner cone 830. Thus, omitting steel wedges 864, 865 can result in a greater rotational speed of the spinner cone 830.

A mounting bracket 866 is provided for attaching the magnet array 860 to the plate 804. The bracket 866 is preferably configured to hold the magnets 861, 862, steel bar 863, and steel wedges 864, 865 at a 45 degree orientation with respect to the plate 804. The mounting bracket 866 is also configured to hold the magnets 861, 862, the steel bar 863, and the steel wedges 864, 865 at a desired height above the plate 804 so as to be in desired proximity to the spinner cone 830 and the helical magnet array 820 as each spinner arm 800 passes through the power bed 850. A slotted opening 868, through which a fastener may be inserted into the plate 804, allows the position and orientation of the magnet array 860 to be adjusted.

As noted, each magnet 861, 862 may comprise a single, integral magnet, or it may comprise multiple magnets placed face to face—e.g., with alternating polarities. In general, single integral magnets result in a greater horizontal force (i.e., parallel to the stator plate 804) and multiple magnets result in greater vertical force (i.e., normal to the stator plate 804). Accordingly, the direction of the force can be tailored according to requirements and specifications by the number of magnets used to make up the magnets 861, 862 of the crescent shaped magnet array 860.

Figure 14:
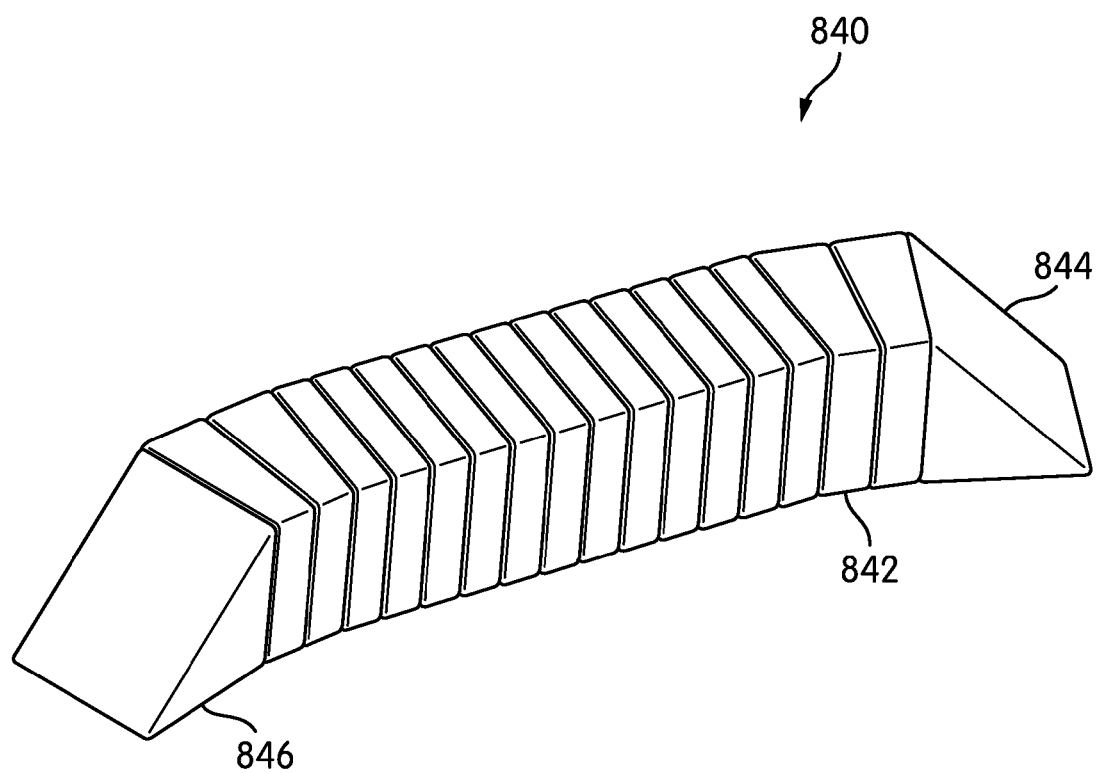
FIG. 14 is a perspective view of a shunt bridge of an alternate embodiment of the invention.

Referring again to FIGS. 8 and 9, the stator plate assembly 802 includes two power beds 850 with shunt bridges 840 disposed between the crescent shape magnet arrays 860. Details of each shunt bridge 840 are shown in FIG. 14. Each shunt bridge 840 preferably includes of a number of Neodymium magnets 842, being in size; 1"×1"×¼" thick, magnetized through ¼" direction and assembled in attractive mode (i.e., alternating N-S polarity) with a minimum of seven, nine, or more magnets 842 (not necessarily limited to these numbers). Steel wedges 844, 846 are positioned on each end of the shunt bridge 840.

Each shunt bridge 840 is oriented with opposite north-south polarity to each crescent shaped magnet array 860. (See FIG. 9).

The purpose of the shunt bridge 840 is to shunt the magnetic field of the crescent shape magnet arrays 860 for the back (radially inner) magnetic field of each spinner approaching the power beds 850. That is, before the spinner cone 830 approaches the power bed 850, the shunt bridges 840 shunt the magnetic fields of the crescent shaped magnet arrays 860, which, in the absence of the shunt bridges 840, would interact magnetically with each other and actually oppose rotation of the spinner arm 800 until the arm is sufficiently within the influence of the power bed 850. It is therefore preferable that the steel wedges 844, 846 of the shunt bridges 840 be sufficiently close to the steel wedges 864, 865 of the crescent shaped magnet arrays 860 so as to accomplish this shunting functionality. When the spinner cone 830 is sufficiently close to the power bed 850, the proximity of the spinner cone 830 causes the magnetic field of the crescent shaped magnet arrays 860 to interact with the magnetic field of the helical magnet array 820 of the spinner cone 830, instead of with the magnetic field of the shunt bridge 840.

A further benefit of the shunt bridge 840, is to propel the spinner 830 and arm 800 in the desired direction. This is accomplished by way of the interaction of the unlike poles direction directly related to the orientation of the poles on the shunt bridge and the overlapping magnet poles on spinner 830. The unlike poles create a rotational torque on the spinner 830 that directly translates to gear 806 in the desired direction. This interaction process occurs only for the time where the unlike poles interact.

Figure 15:
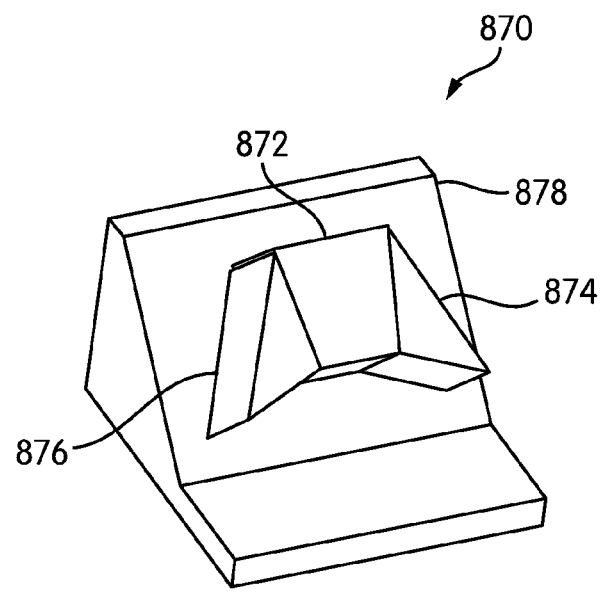
FIG. 15 is a perspective view of a booster field magnet.

Details of the booster field magnet 870 are shown in FIG. 15. Each booster field magnet assembly 870 includes a Neodymium magnet 872 (which may comprise one or more magnets) having, for example, a size 1"×1"×¼" thick, and magnetized thru the ¼" dimension. Steel blocks in size 1"×1"×½" thick (for example) or steel-shape wedges 874, 876 (wedge shape is optional; rectangular steel blocks may be substituted) are optionally provided on each end of the magnet 872. The purpose of the steel blocks or steel shape wedges is for blocking or shunting the magnetic field as the magnetic flux circulates from North to South polarity or South to North and acts as a short circuit for the magnetic flux. Without the steel block or steel shape wedge on each end of the booster field magnet assembly the magnetic flux path on each end protrudes outward rather than through the steel block or steel shape wedge and back to the magnet. This type of setup prevents the magnetic flux from opposing the approaching spinner arm 800 making for smoother rotation in clockwise or counter clockwise movement. As explained above with respect to wedges 864, 865 of the crescent shaped magnet array 860, however, omitting the wedges 874, 876 will allow a larger magnetic field around the booster field magnet assembly 870 and will result in an even greater force repelling movement of the spinner 800 into the power bed 850, but will also result in a greater force rotating the spinner cone 830. Thus, omitting steel wedges 874, 876 can result in a greater rotational speed of the spinner cone 830.

A mounting bracket 878 is provided for mounting the magnet 872 and wedges 874, 876 to the plate 804. The bracket 878 is preferably configured to orient the magnet 872 and wedges 874, 876 at 45 degrees relative to the plate 804. The mounting bracket 878 is also configured to hold the magnet 872 and the steel wedges 874, 876 at a desired height above the plate 804 so as to be in desired proximity to the spinner cone 830 and the helical magnet array 820 as each spinner arm 800 passes through the power bed 850.

The placement of each crescent shaped magnet array 860 and booster field magnet 870 defines a tri-field arrangement defined by the two magnets 861, 862 on the crescent shaped magnet array 860 and the magnet 872 of the booster field magnet 870.

The purpose of the steel bar 863 is to separate or stretch the linked magnetic flux fields in between magnets 861 and 862 of the crescent shaped magnet array 860 through dampening of the flux fields, thereby creating a tri-field comprising magnets 861 and 862 of the crescent shaped magnet array 860 and magnet 872 of the booster field array 870. The separation of the fields by dampening allows the spinner cone 830 to interact with magnetic fields of magnets 861 and 862 (FIG. 13) and magnet 872 (FIG. 15). The order of interaction of the helically arranged magnets of the spinner cone 830 with the magnetic fields of the tri-field defined within the power bed 850 would be fields 861, 872, 862 for counter clockwise movement of the spinner arm 800 or 862, 872, 861 if preferred travel was clockwise.

Figure 16:
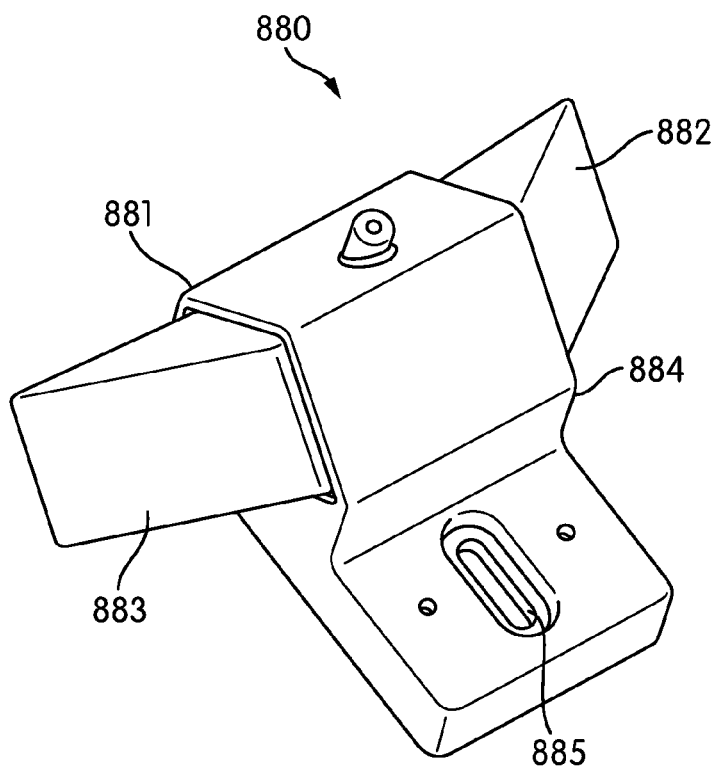
FIG. 16 is a perspective view of an auxiliary power bed.

Details of the auxiliary magnet bed 880 are shown in FIG. 16. Auxiliary magnet bed 880 includes a magnet 881 (comprising one or more individual magnets) of solid rectangular (preferably square) shape and preferably made from Neodymium and optional steel wedges 882, 883 (wedge shape is optional; rectangular steel blocks may be substituted) on opposite ends of the magnet 881. As explained above with respect to wedges 864, 865 of the crescent shaped magnet array 860, however, omitting the wedges 882, 883 will allow a larger magnetic field around the auxiliary magnet bed 880 and will result in an even greater force repelling movement of the spinner 800 into the power bed 850, but will also result in a greater force rotating the spinner cone 830. Thus, omitting steel wedges 882, 883 can result in a greater rotational speed of the spinner cone 830.

The auxiliary magnet bed 880 is displaced from the boost field provided by the tri-field arrangement defined by the crescent shaped magnet array 860 and booster field magnet 870 and negates a negative resistance from starting or reacting 45 degrees prior to the spinner cone 830 entering the boost field and reduces or eliminates the area of magnetic resistance of the tri-fields to the rotation of the spinner arms 800 down to 25 degrees prior to the spinner cone 830 entering the boost field. The angle by which the auxiliary magnet bed 830 is displaced from the boost field (power bed 850) can vary as determined by the position that provides the most benefit, but will typically be up to 45 degrees.

A mounting bracket 884 is provided for attaching the auxiliary magnet bed 880 to the plate 804. The bracket 884 is preferably configured to hold the magnet(s) 881—inside the bracket 884—and steel wedges 882, 883 at a 45 degree orientation with respect to the plate 804. Magnet(s) 881 may extend beyond the edges of the bracket 884 or may be recessed within the bracket 884, depending on the desired size of the magnet(s) 881 and bracket 884. In one embodiment, the magnets 881 comprise square neodymium magnets with dimensions of 1"×1"×¼". A slotted opening 885, through which a fastener may be inserted into the plate 804, allows the position and orientation of the magnet bed 880 to be adjusted. As shown in FIG. 9, in the illustrated embodiment, the auxiliary magnet bed 880 is skewed by an angle $\Theta_A$ (counterclockwise) relative to a true radial orientation. The mounting bracket 884 is also configured to hold the magnet 881 and the steel wedges 882, 883 at a desired height above the plate 804 so as to be in desired proximity to the spinner cone 830 and the helical magnet array 820 as each spinner arm 800 passes through the power bed 850.

Figure 20:
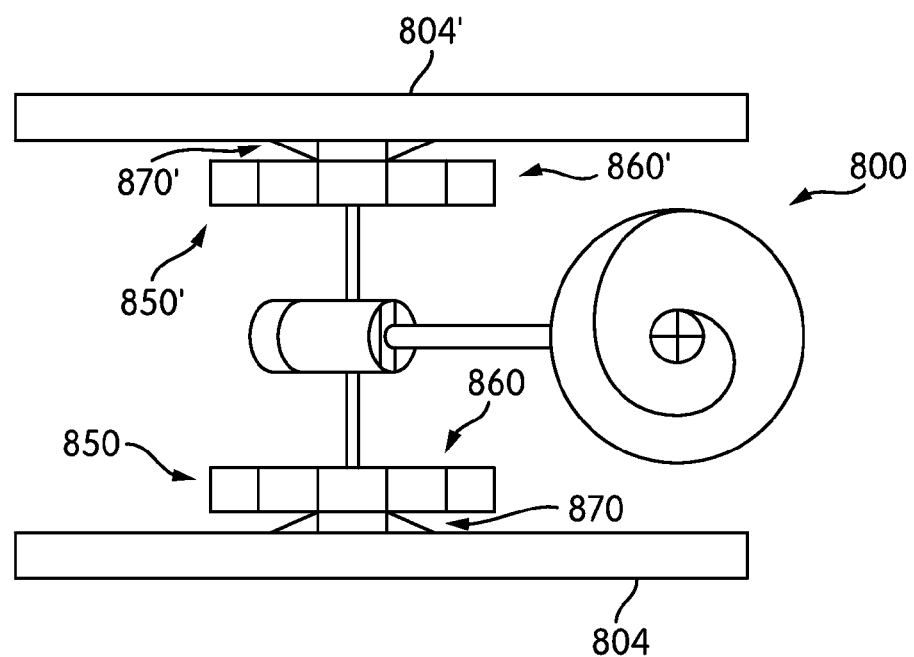
FIG. 20 is a schematic view of a stator plate assembly include two stator plates.

As shown in FIG. 20, for more power, a second stator plate 804' may be mounted above and parallel to stator plate 804 so as to be axially displaced from the stator plate 804 relative to the second axis of rotation (coinciding with the shaft extending perpendicularly from the stator plate 804). Second stator plate 804' may include secondary power beds 850'—each including a crescent shaped magnet array 860' and a booster field magnet 870'—that cooperate with power beds 850 to increase the power applied to the spinner arm 800. In one embodiment, the crescent shaped magnet array 860' and/or the booster field magnet 870' of the secondary power bed 850' are/is angularly offset—e.g., by 5° to 20°, preferably 10° to 15°—with respect to the crescent shaped magnet array 860 and the booster field magnet 870 of the power bed 850. In addition, the crescent shaped magnet array 860' and/or the booster field magnet 870' of the secondary power bed 850' may not include steel wedges on the ends of the respective magnets, while the crescent shaped magnet array 860 and the booster field magnet 870 of the power bed 850 do include steel wedges on the ends of the respective magnets, or vice versa. Steel wedges—or blocks—may be provided on the ends of the magnets of one power bed 850 or 850', the magnets of both power beds 850 and 850' or neither power bed 850 or 850'.

The secondary power bed 850' may further include an auxiliary power bed (such as auxiliary power bed 880, not shown in FIG. 20). In one embodiment, an auxiliary power bed of the secondary power bed 850' may be offset with respect to an auxiliary power bed 880 of the power bed 850. That is, whereas the auxiliary power bed 880 of the power bed 850 may follow the booster field magnet 870 (relative to the rotational direction of motion of the spinner arm 800), the auxiliary power bed of the secondary power bed 850' may precede the booster field magnet 870'.

Furthermore, the power bed 850 shown in FIG. 9 has polarities of the crescent shaped power bed 860 and the booster field magnet 870 that are opposite (i.e., as shown in FIG. 9, the right-hand side crescent shaped power bed 86 has "N" polarity at the top end and "S" polarity at the bottom end, the associated (right-hand side) booster field magnet 870 has "S" polarity at the top end and "N" polarity at the bottom end). The inventor has determined that the crescent shaped magnet array 860' and the booster field magnet 870' of the secondary power bed 850' of the second stator plate 804' should have like polarities. Having like polarities on the crescent shaped magnet array 860' and the booster field magnet 870' of the secondary power bed 850' of the second stator plate 804' decreases or eliminates pull back or negative flux interaction of the secondary power bed 850' with the spinner 830 which would urge the spinner to travel in opposite preferred direction of travel after passing through the crescent shaped magnet array 860' and the booster field magnet 870' of the secondary power bed 850'.

Figure 19:
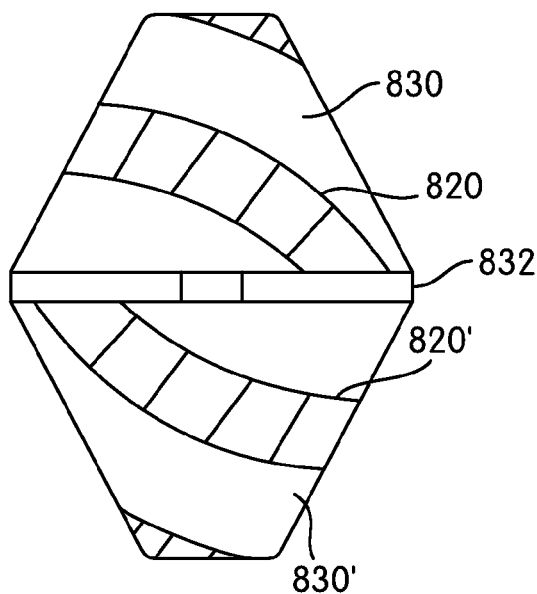
FIG. 19 is a side view of a spinner cone configuration comprising dual cones joined end to end.

As shown in FIG. 19, two spinner cones 830, 830' can be mounted, end to end, on the same shaft, with the wide or narrow ends of the cones facing each other. The spinner cones 830, 830' include helical magnet arrays 820, 820', respectively. A steel disc 832 is preferably provided between the coupled cones for shunting the magnetic flux from each spinner cone. The steel disc between the spinner cones' acts as a short path for magnetic flux as flux lines circulate on back of each spinner cone from South-Pole to North-Pole or vice versa. In addition the steel disc 832 between the spinner cones in this arrangement improves the magnetic flux on the top spinner magnets. The magnetic flux of the spinner on the back without the steel disk would permeate outward away from the back magnets as the flux lines circulate from North to South or South to North and magnetic flux will leak from one spinner cone to the other. The steel disk between the spinner cones also prevents the same polarity facing each other from back of the spinner cones and from bucking each other, thus reducing magnetic flux from the helical magnet array on the outer surface of the spinner cones. This arrangement of spinner cones has the potential to provide more power and torque and decreases the negative resistance significantly.

Figure 21:
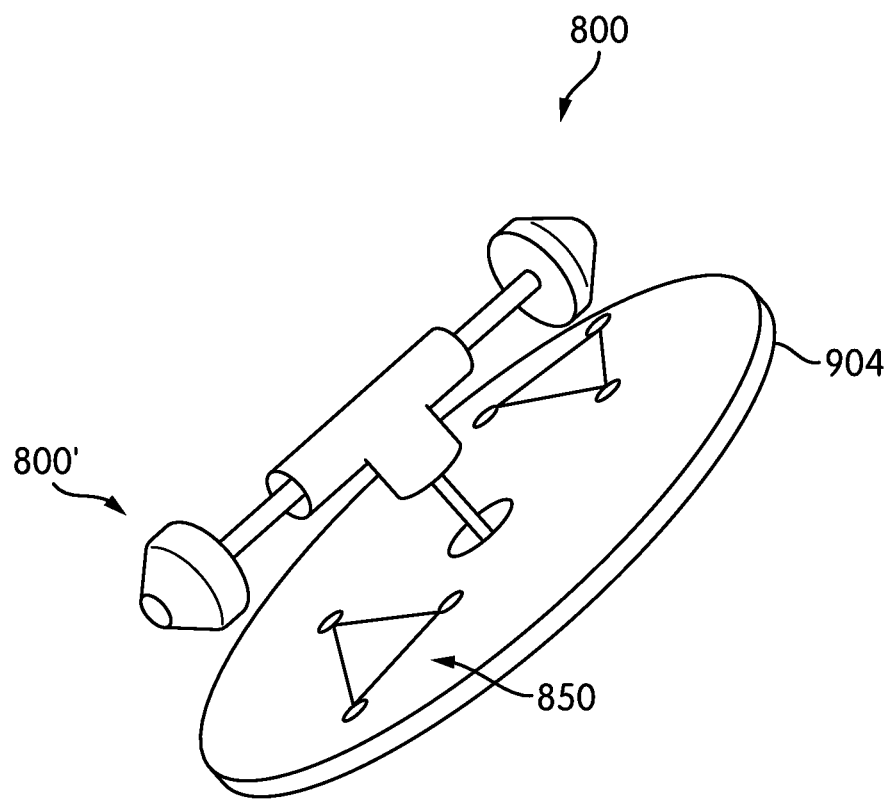
FIG. 21 is perspective view of an apparatus for coupling magnetically induced motion comprising a static spinner cone and a rotating base plate.

FIG. 21 illustrates an alternate embodiment in which two spinner arms 800, 800' are stationary (non-rotating) (each spinner cone spins about its respective axis) and the plate 904 rotates, instead of the spinner arms rotating as described above.

The spinner cone 830 of the stator plate assembly 802 shown in FIGS. 8 and 9 includes a helical magnet array 820 that comprises a double row of Neodymium Iron Boron (NdFeB) magnets of any grade preferably of highest grade available with Nickel (Ni) Plating or coating or triple plating Nickel-Copper-Nickel (Ni—Cu—Ni) for some environment application. In some cases top coating of epoxy on top of triple Nickel-Copper-Nickel plating is provided for a better protection of magnets.

Figure 10:
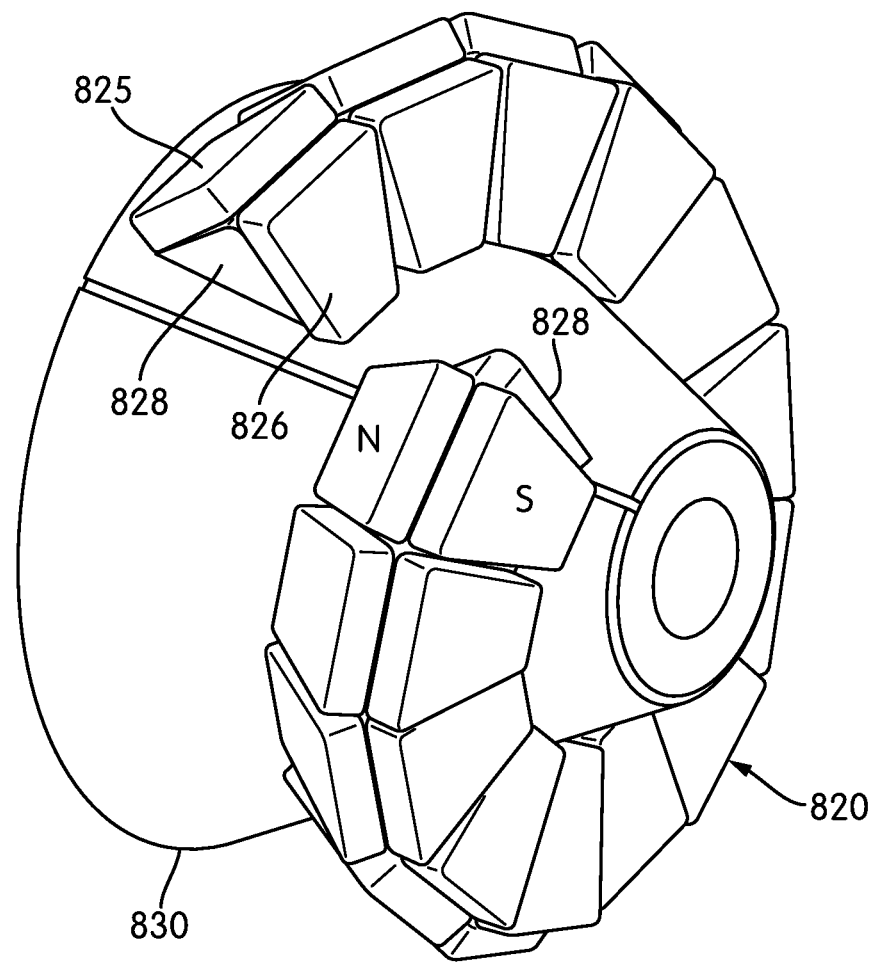
FIG. 10 is a perspective view of a spinner cone with a helical magnet array embodying aspects of an alternative embodiment of the invention.
Figure 11:
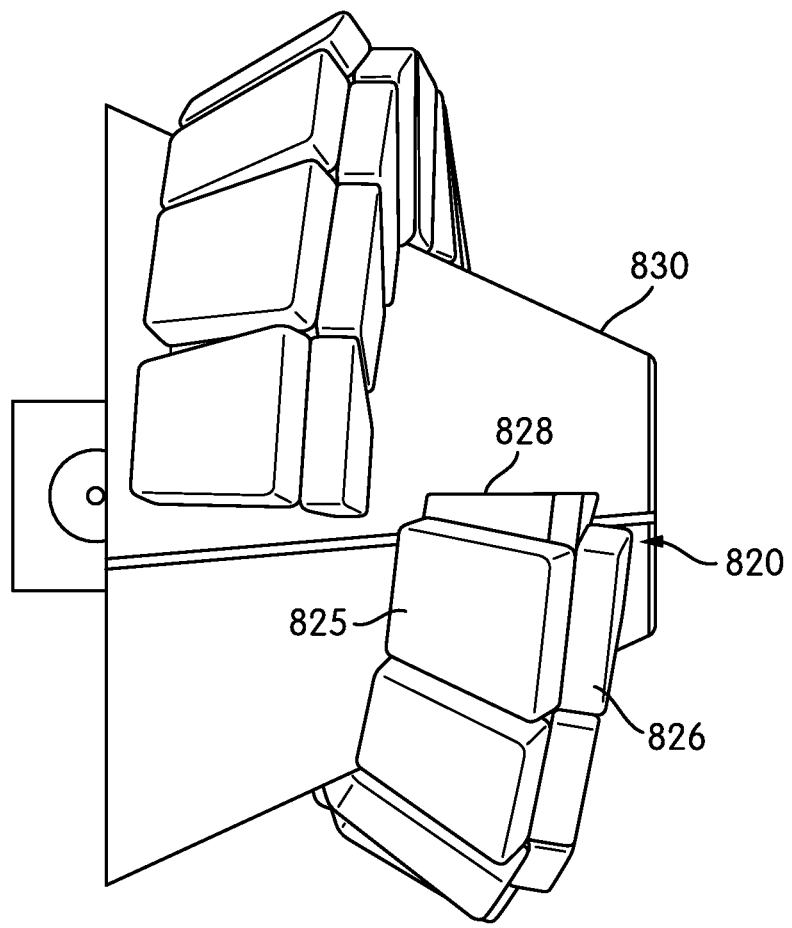
FIG. 11 is a side view of the spinner cone and helical magnet array of FIG. 10.
Figure 12:
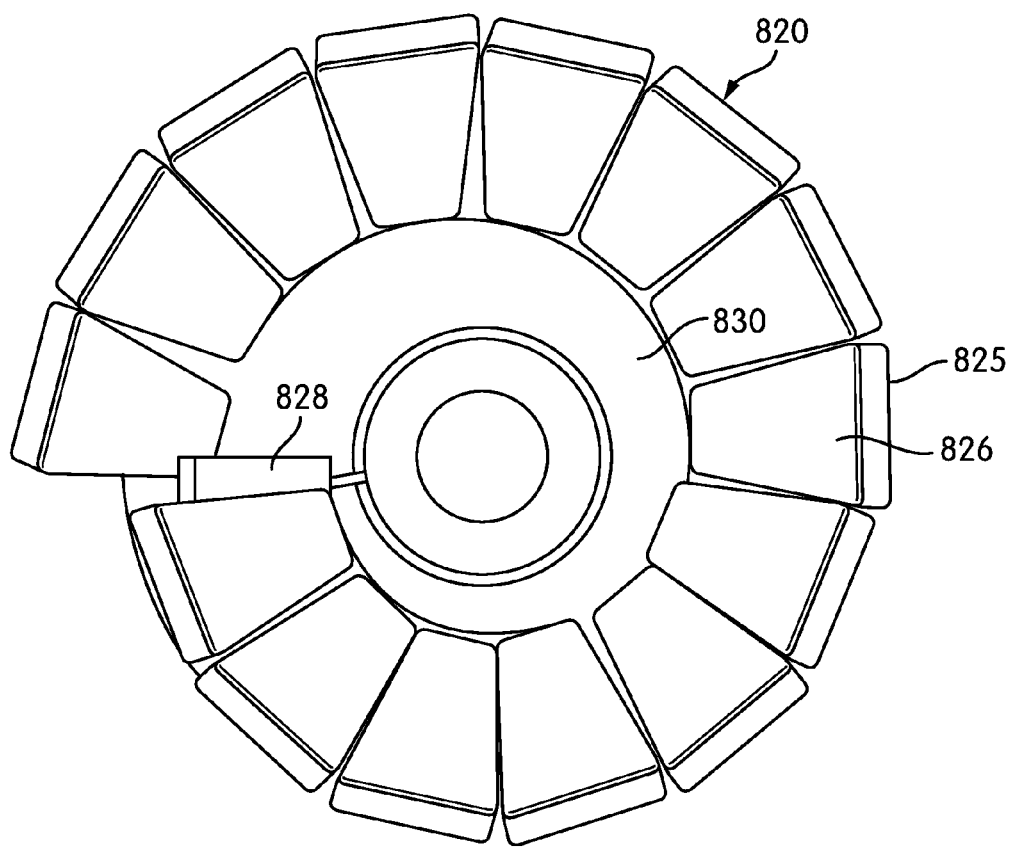
FIG. 12 is an end view of the spinner cone and the helical magnet array of FIG. 10.

As shown in FIGS. 10-12, the array 820 includes an inner row of magnets 825 and an outer row of magnets 826 mounted on a helical mounting backing 828. In a non-limiting example, magnets 825, 826 are rectangular in shape, e.g. 1"×1"×¼" thick, magnetized through the ¼" direction or 1¼" long×1" wide×¼" thick, magnetized through ¼" direction. Magnets could also be circular in shape 1" round×¼" thick, magnetized through ¼" direction. Each magnet may include a countersunk hole for mounting the magnet to the spinner cone 830 or mounting backing 828 by means of a screw or other fastener.

The inner row of magnets 825 and the outer row of magnets 826 are preferably oriented so that the outer face (the pole face) of each inner row magnet 825 is generally parallel to the pole face of the magnets 861, 862 of the crescent shaped magnet array 860 as the spinner cone 830 passes through the power bed 850 and the inner row magnet 825 is on a portion of the spinner code 830 placing the magnet in direct proximity to the magnets 861, 862 as the spinner cone rotates, and the pole face of each outer row magnet 826 is generally parallel to the pole face of the magnet(s) 872 of the booster field magnet 870 and pole face of the magnet 881 of the auxiliary magnet bed 880 as the spinner cone 830 passes through the power bed 850 and the outer row magnet 826 is on a portion of the spinner code 830 placing the magnet in direct proximity to the magnets 872, 881 as the spinner cone rotates. The mounting brackets 866, 878, and 884 are adjustable so as to accommodate spinner cones of different configuration (size, angular orientation and shape) to provide a desired gap (of, e.g., ¼ inch)

between the inner magnets 825 and the magnets 861, 862 and between the outer magnets 826 and magnets 872 and 881. In one embodiment, mounting brackets 866 and 878 are connected to each other or comprise a single, integral bracket for mounting magnets 861, 862, and 872.

Although FIG. 10 shows magnets 825 and 826 having opposite polarities "N" and "S", respectively, on their outwardly facing surfaces, this is not always required, and for some configurations the outwardly facing surfaces may have like polarities. Furthermore, it may not be required for all applications that the inner magnets 825 and/or the outer magnets 826 be provided along the entire length of the helix on the spinner 830. In some configurations, the inner magnets 825 and/or the outer magnets 826 may be provided only along continuous portion or discontinuous portions of the helical path. The number of magnets 825 or 826, i.e., the length of the helix covered by magnets, is directly responsible for the length of time that the spinner cone 830 interacts with the crescent shaped power bed 860 and the booster field bed 870.

Figure 17:
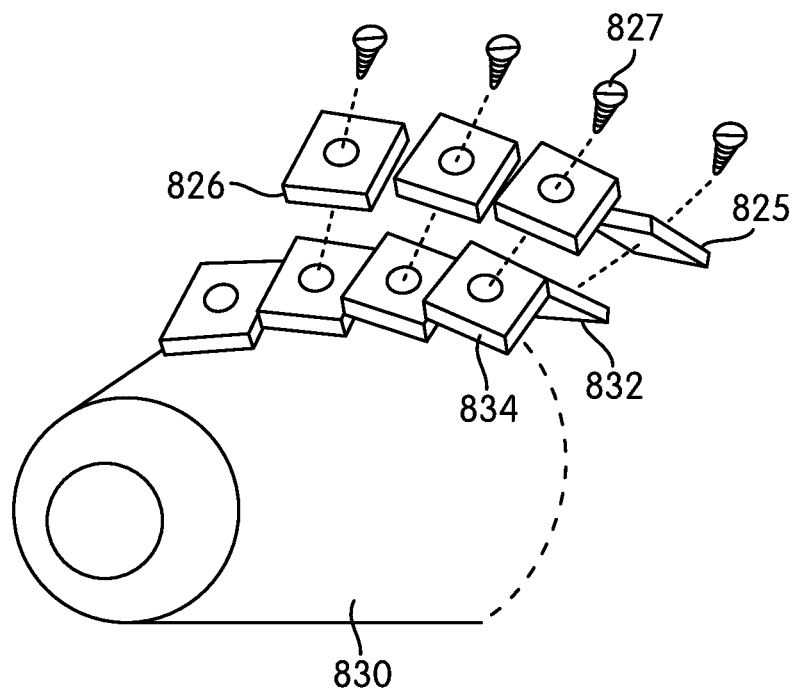
FIG. 17 is a perspective view of a spinner cone with a helical array of two rows of overlapping magnets.
Figure 18:
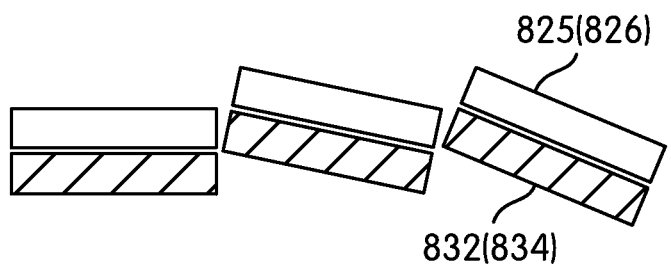
FIG. 18 is a side view detail of overlapping magnets.

As shown in FIGS. 17 and 18, the magnets of the inner row 825 and magnets of the outer row 826 may be mounted on a double row of steps or risers 832, 834, preferably oriented at 45 degrees with respect to plate 804 and each tilted at about 15-25 degrees incline to allow slight overlap of the magnets 825, 826 in the helical array. The depth of steps or risers 832, 834, should be no more than ⅔ the thickness of magnets 825, 826.

The magnets are placed on a spinner and fastened with flat head magnetic type steel screws 827 or magnetic type stainless steel screws.

While various embodiments/variations of the invention have been described above, it should be understood that they have been presented by way of example only, and not limitation. Thus, the breadth and scope of the invention should not be limited by any of the above-described exemplary embodiments, but should be defined only in accordance with the following claims and their equivalents.

What is claimed is:

1. An apparatus for coupling magnetic forces into motive force, the apparatus comprising:
    a spinner arm comprising:
        a helical array of magnets having a helical axis;
        a spinner arm shaft onto which said helical array of magnets is mounted, wherein said spinner arm shaft has a longitudinal axis that is coincident with the helical axis and wherein said spinner arm shaft is mounted so as to be rotatable about a first axis of rotation coinciding with its longitudinal axis and to be rotatable about a second axis of rotation that is transverse to the longitudinal axis; and
    a magnetic power bed comprising a first magnetic boost element and a second magnetic boost element, wherein said first and second magnetic boost elements are positioned with respect to said spinner arm such that at least a portion of said helical array of magnets will pass between said first and second magnetic boost elements as said spinner arm rotates about the second axis of rotation and wherein said helical array of magnets and said first and second magnetic boost elements are cooperatively arranged so that magnetic interaction between said helical array of magnets and said first and second magnetic boost elements causes said spinner arm and said helical array of magnets to rotate about the first axis of rotation as at least a portion of said helical array of magnets passes between said first and second magnetic boost elements, and wherein said first and second magnetic boost elements define a tri-field arrangement of magnetic flux whereby said first magnetic boost element comprises two magnetic blocks separated by a magnetically-responsive material and said second magnetic boost element comprises a single magnetic block.

2. The apparatus of claim 1, wherein said first magnetic boost element is located radially inwardly of said second magnetic boost element relative to said second axis of rotation.

3. The apparatus of claim 2, wherein said first magnetic boost element and said second magnetic boost element are radially aligned relative to said second axis of rotation.

4. The apparatus of claim 1, wherein said first magnetic boost element comprises a crescent shaped magnet array including a first arc-shaped magnetic block and a second arc-shaped magnetic block with a steel bar disposed between said first and second arc-shaped magnetic blocks.

5. The apparatus of claim 4, wherein said crescent shaped magnet array further comprises a first steel shunt element disposed on an end of said first arc-shaped magnetic block opposite said steel bar and a second steel shunt element disposed on an end of said second arc-shaped magnetic block opposite said steel bar.

6. The apparatus of claim 5, wherein said first and second steel shunt elements are wedge shaped.

7. The apparatus of claim 4, wherein at least one of said first and second arc-shaped magnetic blocks comprises a single integral magnet.

8. The apparatus of claim 4, wherein said first and second magnetic blocks comprise Neodymium.

9. The apparatus of claim 1, wherein said second magnetic boost element comprises a booster field magnet comprising a single magnetic block.

10. The apparatus of claim 9, wherein said magnetic block of said booster field magnet comprises a single, integral magnet.

11. The apparatus of claim 9, wherein said magnetic block of said booster field magnet comprises Neodymium.

12. The apparatus of claim 9, wherein said booster field magnet further comprises steel shunt elements located on opposite ends of said magnetic block.

13. The apparatus of claim 12, wherein said steel shunt elements are wedge shaped.

14. The apparatus of claim 1, wherein said magnetic power bed further comprises an auxiliary magnet array disposed at a position that is angularly offset about said second axis of rotation from said first and second magnetic boost elements.

15. The apparatus of claim 14, wherein said auxiliary magnet array comprises a single magnetic block.

16. The apparatus of claim 15, wherein said magnetic block of said auxiliary magnet array comprises a single, integral magnet.

17. The apparatus of claim 15, wherein said magnetic block of said auxiliary magnet array comprises Neodymium.

18. The apparatus of claim 15, wherein said auxiliary magnet array further comprises steel shunt elements located on opposite ends of said magnetic block.

19. The apparatus of claim 18, wherein said steel shunt elements are wedge shaped.

20. The apparatus of claim 1, further comprising a secondary magnetic power bed axially displaced from said magnetic power bed with respect to said second axis of rotation, said secondary magnetic power bed comprising a first magnetic boost element and a second magnetic boost element, wherein said first and second magnetic boost elements of said secondary magnetic power bed are positioned with respect to said spinner arm such that at least a portion of said helical array of magnets will pass between said first and second magnetic boost elements of said secondary magnetic power bed as said spinner arm rotates about the second axis of rotation and wherein said helical array of magnets and said first and second magnetic boost elements of said secondary magnetic power bed are cooperatively arranged so that magnetic interaction between said helical array of magnets and said first and second magnetic boost elements of said secondary magnetic power bed causes said spinner arm and said helical array of magnets to rotate about the first axis of rotation as at least a portion of said helical array of magnets passes between said first and second magnetic boost elements of said secondary magnetic power bed, and wherein said first and second magnetic boost elements of said secondary magnetic power bed define a tri-field arrangement of magnetic flux whereby said first magnetic boost element comprises two magnetic blocks separated by a magnetically-responsive material and said second magnetic boost element comprises a single magnetic block.

21. The apparatus of claim 20, wherein the first and second magnetic boost elements of said secondary magnetic power bed are angularly offset with respect to said first and second magnetic boost elements of said magnetic power bed.

22. The apparatus of claim 1, wherein said helical array of magnets is mounted on a cone.

23. The apparatus of claim 1, wherein said helical array of magnets comprises a first row of magnets and a second row of magnets, both extending along a helical path.

24. The apparatus of claim 23, wherein each of the magnets of said first row of magnets is arranged at an angle with respect to each of the magnets of said second row of magnets.

25. The apparatus of claim 24, wherein the magnets of said first and second rows of magnets are mounted on a helical mounting backing.

26. The apparatus of claim 1, further comprising a hub within which said spinner arm shaft is mounted and configured to allow rotation of said spinner arm shaft about the first axis of rotation.

27. The apparatus of claim 26, further comprising:
a stator plate on which said magnetic power bed is mounted; and
a shaft extending perpendicularly from said stator plate and having a longitudinal axis coincident with said second axis of rotation,
wherein said hub is coupled to said perpendicular shaft so as to be rotatable about the second axis of rotation.

28. The apparatus of claim 1, wherein the pole face of each magnet of the helical array of magnets is parallel to a pole face of a magnetic block of the first or second magnetic boost element during at least a portion of the time the helical array of magnets is passing between the first and second magnetic boost elements.

29. An apparatus for coupling magnetic forces into motive force, the apparatus comprising:
a first spinner arm comprising:
a first helical array of magnets having a helical axis;
a first spinner arm shaft onto which said first helical array of magnets is mounted, wherein said first spinner arm has a longitudinal axis that is coincident with the helical axis and wherein said first spinner arm shaft is mounted so as to be rotatable about a first axis of rotation coinciding with its longitudinal axis and to be rotatable about a second axis of rotation that is transverse to the longitudinal axis;
a second spinner arm comprising:
a second helical array of magnets having a helical axis;
a second spinner arm shaft onto which said second helical array of magnets is mounted, wherein said second spinner arm has a longitudinal axis that is coincident with the helical axis and with the longitudinal axis of said first spinner arm shaft and wherein said second spinner arm shaft is mounted so as to be rotatable about the first axis of rotation and to be rotatable about the second axis of rotation;
a first magnetic power bed comprising a first magnetic boost element and a second magnetic boost element, wherein said first and second magnetic boost elements of said first magnetic power bed are positioned with respect to said first and second spinner arms such that at least a portion of each of said first and second helical arrays of magnets will pass between said first and second magnetic boost elements of said first magnetic power bed as said first and second spinner arms rotate about the second axis of rotation and wherein said first and second helical arrays of magnets and said first and second magnetic boost elements of said first magnetic power bed are cooperatively arranged so that magnetic interaction between said first and second helical arrays of magnets and said first and second magnetic boost elements of said first magnetic power bed causes each spinner arm and helical array of magnets to rotate about the first axis of rotation as at least a portion of each of said first and second helical arrays of magnets passes between said first and second magnetic boost elements of said first magnetic power bed; and
a second magnetic power bed comprising a first magnetic boost element and a second magnetic boost element, wherein said first and second magnetic boost elements of said second magnetic power bed are positioned with respect to said first and second spinner arms such that at least a portion of each of said first and second helical arrays of magnets will pass between said first and second magnetic boost elements of said second magnetic power bed as said first and second spinner arms rotate about the second axis of rotation and wherein said first and second helical arrays of magnets and said first and second magnetic boost elements of said second magnetic power bed are cooperatively arranged so that magnetic interaction between said first and second helical arrays of magnets and said first and second magnetic boost elements of said second magnetic power bed causes each spinner arm and helical array of magnets to rotate about the first axis of rotation as at least a portion of each of said first and second helical arrays of magnets passes between said first and second magnetic boost elements of said second magnetic power bed,
wherein said first and second power beds are located at diametrically opposed positions with respect to the second axis of rotation,
wherein said first and second magnetic boost elements of said first magnetic power bed define a first tri-field arrangement of magnetic flux whereby said first magnetic boost element comprises two magnetic blocks separated by a magnetically-responsive material and said second magnetic boost element comprises a single magnetic block, and wherein said first and second magnetic boost elements of said second magnetic power bed define a second tri-field arrangement of magnetic flux whereby said first magnetic boost element comprises two magnetic blocks separated by a magnetically-responsive material and said second magnetic boost element comprises a single magnetic block.

30. The apparatus of claim 29, further comprising a shunt bridge extending between said first and second magnetic power beds and configured to provide a pathway for magnetic flux to flow from said first magnetic power bed to said second magnetic power bed.

31. The apparatus of claim 30, wherein said shunt bridge comprises a plurality of magnets arranged side-by-side with alternating polarities.

32. The apparatus of claim 31, wherein said shunt bridge further comprises a steel shunt element located at each opposite end of said shunt bridge.

33. The apparatus of claim 30, comprising two shunt bridges extending between said first and second magnetic power beds and disposed on diametrically opposed sides of said second axis of rotation.

\* \* \* \* \*